(12) United States Patent
Abramsky et al.

(10) Patent No.: US 10,020,863 B2
(45) Date of Patent: Jul. 10, 2018

(54) TECHNIQUES FOR DETECTING A CANDIDATE INFORMATION SIGNAL OF UNKNOWN SIGNAL STRENGTH USING RECEIVERS SET TO DIFFERENT FIXED GAIN STATES

(71) Applicant: QUALCOMM Incorporated, San Diego, CA (US)

(72) Inventors: Victor Abramsky, Edison, NJ (US); Guy Wolf, Hod HaSharon (IL)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 15/184,872

(22) Filed: Jun. 16, 2016

(65) Prior Publication Data
US 2017/0264356 A1    Sep. 14, 2017

Related U.S. Application Data

(60) Provisional application No. 62/306,697, filed on Mar. 11, 2016.

(51) Int. Cl.
*H04W 24/08* (2009.01)
*H04B 7/08* (2006.01)
*H04W 74/08* (2009.01)

(52) U.S. Cl.
CPC .......... *H04B 7/082* (2013.01); *H04B 7/0814* (2013.01); *H04W 24/08* (2013.01); *H04W 74/0816* (2013.01)

(58) Field of Classification Search
CPC ...... H04B 7/08; H04B 7/0802; H04B 7/0814; H04B 7/0874; H04B 7/082; H04W 24/10
See application file for complete search history.

(56) References Cited

U.S. PATENT DOCUMENTS 6,018,651 A * 1/2000 Bruckert ............ H04B 7/0874
375/347
6,049,251 A    4/2000 Meyer
(Continued)

FOREIGN PATENT DOCUMENTS

EP    2731265 A1    5/2014

OTHER PUBLICATIONS

ISA/EP, International Search Report and Written Opinion of the International Searching Authority, Int'l Application No. PCT/US2017/013423, dated Apr. 7, 2017, European Patent Office, Rijswijk, NL, 14 pgs.

*Primary Examiner* — Thanh Le
(74) *Attorney, Agent, or Firm* — Holland & Hart LLP

(57) ABSTRACT

A method for wireless communication includes monitoring a channel of a radio frequency spectrum band using at least a first receiver and a second receiver in parallel; determining, during the monitoring, at least a first received signal strength of a first receiver output of the first receiver, and a second received signal strength of a second receiver output of the second receiver; and selecting, based on the first received signal strength and the second received signal strength, one or both of the first receiver output or the second receiver output for use in decoding a candidate information signal of unknown signal strength. The first and second receivers are set to first and second fixed gain state providing the first and second receivers with first and second dynamic ranges. The second dynamic range partially overlaps the first dynamic range to provide the wireless device an extended dynamic range.

30 Claims, 13 Drawing Sheets

(56) References Cited

U.S. PATENT DOCUMENTS

| | | |
|---|---|---|
| 8,750,276 B2 | 6/2014 | Wu |
| 8,971,456 B2 | 3/2015 | Galan et al. |
| 9,191,037 B2 | 11/2015 | Lascari et al. |
| 2003/0184277 A1 | 10/2003 | Khorram et al. |
| 2004/0259511 A1* | 12/2004 | Liu ............... H04B 7/0814 455/136 |
| 2010/0040178 A1* | 2/2010 | Sutton ............ H04B 7/0845 375/345 |
| 2015/0098397 A1 | 4/2015 | Damnjanovic et al. |

* cited by examiner

TECHNIQUES FOR DETECTING A CANDIDATE INFORMATION SIGNAL OF UNKNOWN SIGNAL STRENGTH USING RECEIVERS SET TO DIFFERENT FIXED GAIN STATES

CROSS REFERENCES

The present application for patent claims priority to U.S. Provisional Patent Application No. 62/306,697 by Abramsky et al., entitled "Techniques for Detecting a Candidate Information Signal of Unknown Signal Strength Using Receivers Set to Different Fixed Gain States," filed Mar. 11, 2016, assigned to the assignee hereof.

BACKGROUND

Field of the Disclosure

The present disclosure, for example, relates to wireless communication systems, and more particularly to techniques for detecting a candidate information signal of unknown signal strength using receivers set to different fixed gain states.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

In some cases, wireless devices (e.g., base stations and UEs) may communicate over a contention-based radio frequency spectrum band (e.g., a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). Prior to communicating over a channel of a contention-based radio frequency spectrum band, a wireless device may monitor (or listen to) the channel to determine whether another wireless device is already using the channel. The wireless device may win contention for access to the channel, and use the channel, when the wireless device detects that no other wireless device is using the channel.

SUMMARY

The present disclosure, for example, relates to techniques for detecting a candidate information signal of unknown signal strength using receivers set to different fixed gain states. The receivers may include at least a first receiver set to a first fixed gain state (e.g., a high gain state), and a second receiver set to a second fixed gain state (e.g., a low gain state). The first fixed gain state may provide the first receiver with a first dynamic range, and the second fixed gain state may provide the second receiver with a second dynamic range. The second dynamic range may partially overlap the first dynamic range to provide a wireless device including the receivers with an extended dynamic range. When a candidate information signal of unknown signal strength is received by the wireless device, the signal may be detected by one or both of the first receiver or the second receiver. Based at least in part on the received signal strength of the candidate information signal at the first receiver or the second receiver, an output of one or both of the receivers may be selected for decoding the candidate information signal. After the strength of the signal is determined, the gain state of one or both of the receivers may be adjusted to provide the wireless device with diversity in signal reception.

A method for wireless communication at a wireless device is described. The method may include monitoring a channel of a radio frequency spectrum band using at least a first receiver and a second receiver in parallel; determining, during the monitoring, at least a first received signal strength of a first receiver output of the first receiver, and a second received signal strength of a second receiver output of the second receiver; and selecting, based at least in part on the first received signal strength and the second received signal strength, one or both of the first receiver output or the second receiver output for use in decoding a candidate information. The first receiver may be set to a first fixed gain state providing the first receiver with a first dynamic range, and the second receiver may be set to a second fixed gain state providing the second receiver with a second dynamic range. The second dynamic range may partially overlap the first dynamic range to provide the wireless device an extended dynamic range.

An apparatus for wireless communication at a wireless device is described. The apparatus may include means for monitoring a channel of a radio frequency spectrum band using at least a first receiver and a second receiver in parallel; means for determining, during the monitoring, at least a first received signal strength of a first receiver output of the first receiver, and a second received signal strength of a second receiver output of the second receiver; and means for selecting, based at least in part on the first received signal strength and the second received signal strength, one or both of the first receiver output or the second receiver output for use in decoding a candidate information signal. The first receiver may be set to a first fixed gain state providing the first receiver with a first dynamic range, and the second receiver may be set to a second fixed gain state providing the second receiver with a second dynamic range. The second dynamic range may partially overlap the first dynamic range to provide the wireless device an extended dynamic range.

Another apparatus for wireless communication at a wireless device is described. The apparatus may include a channel monitor to monitor a channel of a radio frequency spectrum band using at least a first receiver and a second receiver in parallel; a signal strength determiner to determine, during the monitoring, at least a first received signal strength of a first receiver output of the first receiver, and a second received signal strength of a second receiver output of the second receiver; and a receiver output selector to select, based at least in part on the first received signal strength and the second received signal strength, one or both of the first receiver output or the second receiver output for use in decoding a candidate information signal. The first receiver may be set to a first fixed gain state providing the first receiver with a first dynamic range, and the second receiver may be set to a second fixed gain state providing the second receiver with a second dynamic range. The second dynamic range may partially overlap the first dynamic range to provide the wireless device an extended dynamic range.

A non-transitory computer-readable medium is described. The non-transitory computer-readable medium may store computer-readable code that, when executed by at least one processor, causes at least one wireless device to monitor a channel of a radio frequency spectrum band using at least a first receiver and a second receiver in parallel; determine, during the monitoring, at least a first received signal strength of a first receiver output of the first receiver, and a second received signal strength of a second receiver output of the second receiver; and select, based at least in part on the first received signal strength and the second received signal strength, one or both of the first receiver output or the second receiver output for use in decoding a candidate information signal. The first receiver may be set to a first fixed gain state providing the first receiver with a first dynamic range, and the second receiver may be set to a second fixed gain state providing the second receiver with a second dynamic range. The second dynamic range may partially overlap the first dynamic range to provide the wireless device an extended dynamic range.

Some examples of the method, apparatus, or non-transitory computer-readable medium described above may further include processes, features, means, or instructions for comparing one or more of the first received signal strength to the second received signal strength, or the first received signal strength to a saturation threshold, or the second received signal strength to the saturation threshold. In these examples, the selecting is further based at least in part on the comparing. In some examples of the method, apparatus, or non-transitory computer-readable medium, the selecting may include selecting a receiver output having a greatest received signal strength below the saturation threshold.

In some examples of the method, apparatus, or non-transitory computer-readable medium, the selecting may include identifying at least one receiver output associated with a received signal strength below the saturation threshold, and selecting, from the identified at least one receiver output, a receiver output of a receiver having a highest fixed gain state. In some examples of the method, apparatus, or non-transitory computer-readable medium, the selecting may include determining all receiver outputs exceed the saturation threshold, and selecting a receiver output having a lowest received signal strength. Some examples of the method, apparatus, or non-transitory computer-readable medium described above may further include processes, features, means, or instructions for adjusting, based at least in part on the first received signal strength or the second received signal strength, one or both of: the first fixed gain state, or the second fixed gain state. In some examples of the method, apparatus, or non-transitory computer-readable medium, the adjusting may include setting the first fixed gain state and the second fixed gain state equal to a same fixed gain state.

Some examples of the method, apparatus, or non-transitory computer-readable medium described above may further include processes, features, means, or instructions for performing the monitoring while contending for access to the channel of the radio frequency spectrum band, decoding the candidate information signal, and refraining from accessing the channel of the radio frequency spectrum band based at least in part on the decoding. Some examples of the method, apparatus, or non-transitory computer-readable medium described above may further include processes, features, means, or instructions for obtaining a network allocation vector (NAV) from the decoding, and refraining from accessing the channel of the radio frequency spectrum band for a period of time indicated by the NAV.

Some examples of the method, apparatus, or non-transitory computer-readable medium described above may further include processes, features, means, or instructions for detecting, based at least in part on the first receiver output or the second receiver output, an energy signature representing the candidate information signal. In these examples, the selecting may be further based at least in part on detecting the energy signature representing the candidate information signal. In some examples of the method, apparatus, or non-transitory computer-readable medium, detecting the energy signature may include one or more of: detecting an energy satisfying an energy threshold for a predetermined period of time, or detecting an average energy satisfying an average energy threshold for the predetermined period of time, or detecting a Wi-Fi preamble. In some examples of the method, apparatus, or non-transitory computer-readable medium, the first received signal strength may include a first received signal strength indicator (RSSI) and the second received signal strength may include a second RSSI.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Wireless devices may communicate over a contention-free radio frequency spectrum band (e.g., a radio frequency spectrum band for which transmitting apparatuses may not contend for access because the radio frequency spectrum band is licensed to particular users for particular uses (e.g., a licensed radio frequency spectrum band usable for Long-Term Evolution (LTE) or LTE-Advanced (LTE-A) communications)) or a contention-based radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some cases, a wireless device may monitor a channel of a radio frequency spectrum band for a signal of unknown signal strength. For example, before accessing a channel of a contention-based radio frequency spectrum band, a wireless device may contend for access to the channel by monitoring the channel for transmissions of other wireless devices. The transmissions of other wireless devices may be of unknown signal strength.

In some cases, a wireless device may monitor a channel of a radio frequency spectrum band using a single receiver associated with a dynamic gain state (e.g., a gain state controlled by an automatic gain control (AGC) circuit). However, automatic gain control may be associated with an AGC convergence delay. The AGC convergence delay may be undesirable when fast detection of the signal is desired. The use of two receivers with fixed gain states, in parallel, may provide faster detection of a signal having an unknown signal strength.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
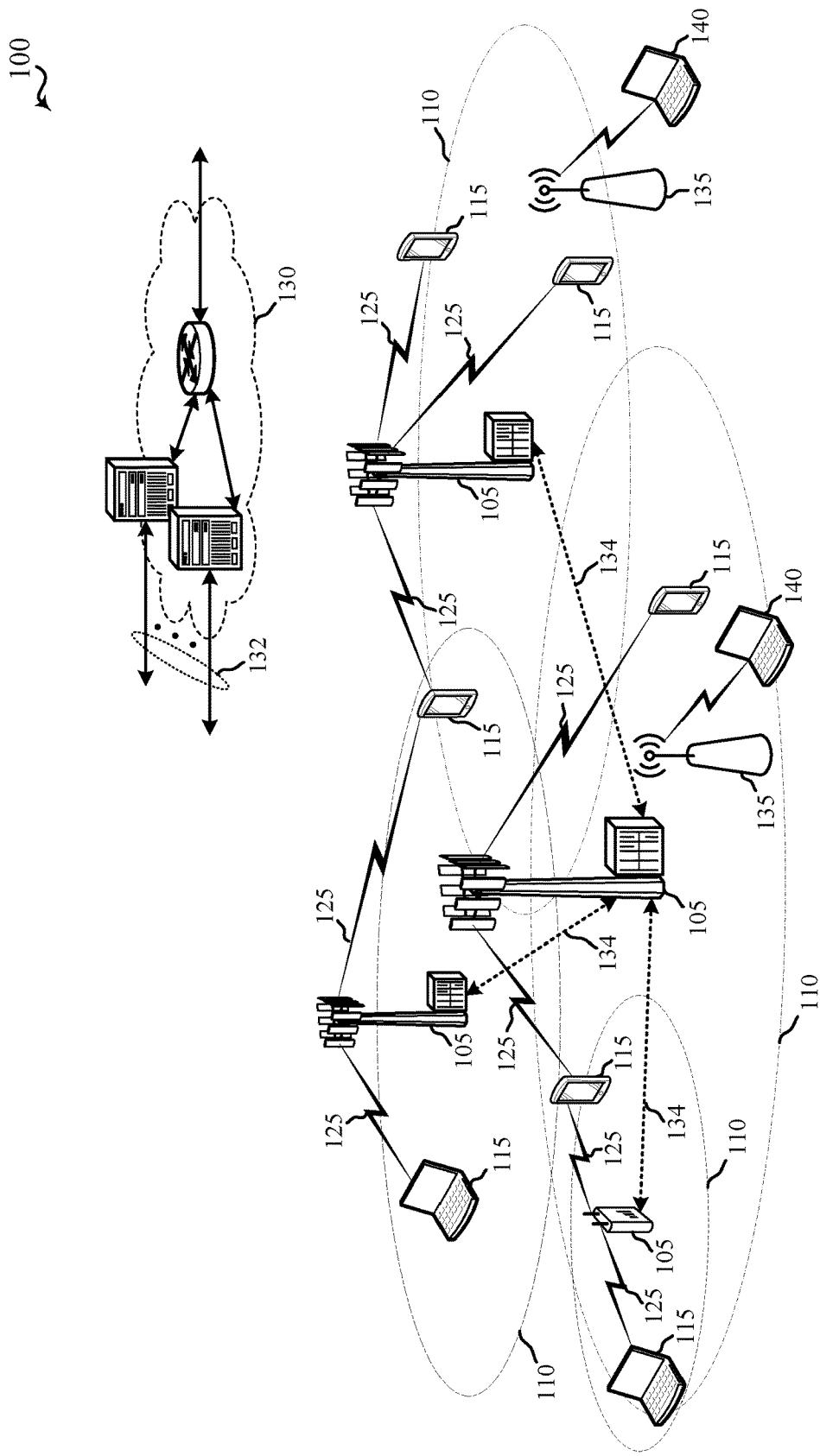
FIG. 1 shows an example of a wireless communication system, in accordance with various aspects of the present disclosure.

FIG. 1 shows an example of a wireless communication system 100, in accordance with various aspects of the present disclosure. The wireless communication system 100 may include base stations 105, user equipment (UEs) 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors (not shown) making up a portion of the coverage area. The wireless communication system 100 may include base stations 105 of different types (e.g., macro or small cell base stations). There may be overlapping geographic coverage areas 110 for different technologies.

In some examples, the wireless communication system 100 may include an LTE/LTE-A network and may employ narrowband communication techniques, as described below. In LTE/LTE-A networks, the term evolved Node B (eNB) may be used to describe the base stations 105. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different radio frequency spectrum bands (e.g., contention-free, contention-based, etc.) as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a narrowband LTE (NB-LTE) device, a machine-to-machine (M2M) device, a machine-type communication (MTC) device, an NB-internet of things (IoT) device, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions. The communication links 125 may include dedicated PUCCH resources for narrowband communication, as described in the present disclosure.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency division duplexing (FDD) operation (e.g., using paired spectrum resources) or a time division duplexing (TDD) operation (e.g., using unpaired spectrum resources). Frame structures for FDD operation (e.g., frame structure type 1) and TDD operation (e.g., frame structure type 2) may be defined.

In some examples, the wireless communication system 100 may support operation over a contention-free radio frequency spectrum band (e.g., a radio frequency spectrum band for which transmitting apparatuses may not contend for access because the radio frequency spectrum band is licensed to particular users for particular uses (e.g., a licensed radio frequency spectrum band usable for LTE/LTE-A communications)) or a contention-based radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). A transmitting apparatus (e.g., a base station 105 or UE 115) may contend for access to a channel of the contention-based radio frequency spectrum band by monitoring the channel for energy or energy signatures of other transmitting apparatuses for a period of time representing a contention window. Upon winning contention for access to a channel of the contention-based radio frequency spectrum band, a transmitting apparatus may transmit one or more channel reservation signals (e.g., one or more channel usage beacon signals (CUBS)) over the channel. The CUBS may reserve the channel by providing a detectable energy on the channel. The CUBS may also serve to identify the transmitting apparatus or synchronize the transmitting apparatus and a receiving apparatus. In some examples, the CUBS may include a cell-specific reference signal (CRS). In some examples, the CUBS may include a Wi-Fi clear-to-send (CTS) packet. Upon not winning contention for access to a channel of the contention-based radio frequency spectrum band, a transmitting apparatus may refrain from accessing the channel for a period of time.

Figure 2:
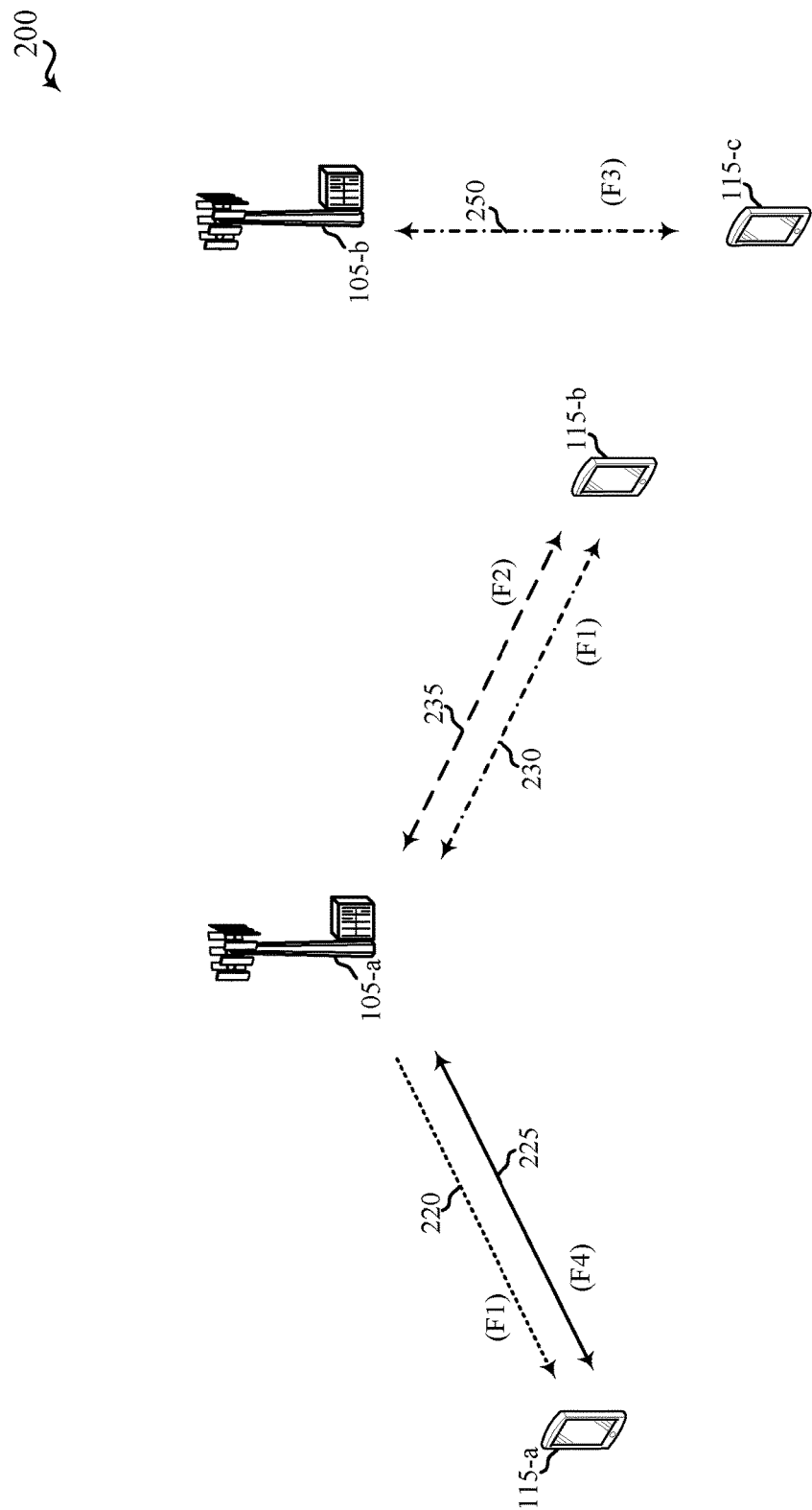
FIG. 2 shows a wireless communication system in which Long-Term Evolution (LTE)/LTE-Advanced (LTE-A) may be deployed under different scenarios using a contention-based radio frequency spectrum band, in accordance with various aspects of the present disclosure.

FIG. 2 shows a wireless communication system 200 in which LTE/LTE-A may be deployed under different scenarios using a contention-based radio frequency spectrum band, in accordance with various aspects of the present disclosure. More specifically, FIG. 2 illustrates examples of a supplemental downlink mode (referred to as a licensed assisted access (LAA) mode), a carrier aggregation mode, and a standalone mode, in which LTE/LTE-A orthogonal frequency division multiplexing (OFDM) numerology is employed using a contention-based radio frequency spectrum band. The wireless communication system 200 may be an example of portions of the wireless communication system 100 described with reference to FIG. 1. Moreover, a first base station 105-a and a second base station 105-b may be examples of aspects of one or more of the base stations 105 described with reference to FIG. 1, while a first UE 115-a, a second UE 115-b, and a third UE 115-c may be examples of aspects of one or more of the UEs 115 described with reference to FIG. 1.

In the example of the supplemental downlink mode (e.g., the licensed assisted access mode) in the wireless communication system 200, the first base station 105-*a* may transmit OFDMA waveforms to the first UE 115-*a* using a downlink channel 220. The downlink channel 220 may be associated with a frequency F1 in a contention-based radio frequency spectrum band. The first base station 105-*a* may transmit OFDMA waveforms to the first UE 115-*a* using a first bidirectional link 225 and may receive single carrier-FDMA (SC-FDMA) waveforms from the first UE 115-*a* using the first bidirectional link 225. The first bidirectional link 225 may be associated with a frequency F4 in a contention-free radio frequency spectrum band. The downlink channel 220 in the contention-based radio frequency spectrum band and the first bidirectional link 225 in the contention-free radio frequency spectrum band may operate contemporaneously. The downlink channel 220 may provide a downlink capacity offload for the first base station 105-*a*. In some examples, the downlink channel 220 may be used for unicast services (e.g., addressed to one UE 115) or for multicast services (e.g., addressed to several UEs 115). This scenario may occur with any service provider (e.g., a mobile network operator (MNO)) that uses a contention-free radio frequency spectrum and needs to relieve some of the traffic or signaling congestion.

In the example of the carrier aggregation mode in the wireless communication system 200, the first base station 105-*a* may transmit OFDMA waveforms to the second UE 115-*b* using a second bidirectional link 230 and may receive OFDMA waveforms, SC-FDMA waveforms, or resource block interleaved FDMA waveforms from the second UE 115-*b* using the second bidirectional link 230. The second bidirectional link 230 may be associated with the frequency F1 in the contention-based radio frequency spectrum band. The first base station 105-*a* may also transmit OFDMA waveforms to the second UE 115-*b* using a third bidirectional link 235 and may receive SC-FDMA waveforms from the second UE 115-*b* using the third bidirectional link 235. The third bidirectional link 235 may be associated with a frequency F2 in a contention-free radio frequency spectrum band. The second bidirectional link 230 may provide a downlink and uplink capacity offload for the first base station 105-*a*. Like the supplemental downlink mode (e.g., licensed assisted access mode) described above, this scenario may occur with any service provider (e.g., MNO) that uses a contention-free radio frequency spectrum and needs to relieve some of the traffic or signaling congestion.

As described above, one type of service provider that may benefit from the capacity offload offered by using LTE/LTE-A in a contention-based radio frequency spectrum band is a traditional MNO having access rights to an LTE/LTE-A contention-free radio frequency spectrum band. For these service providers, an operational example may include a bootstrapped mode (e.g., supplemental downlink, carrier aggregation) that uses an LTE/LTE-A primary component carrier (PCC) on the contention-free radio frequency spectrum band and at least one secondary component carrier (SCC) on the contention-based radio frequency spectrum band.

In the carrier aggregation mode, data and control may, for example, be communicated in the contention-free radio frequency spectrum band (e.g., via first bidirectional link 225 or third bidirectional link 235) while data may, for example, be communicated in the contention-based radio frequency spectrum band (e.g., via second bidirectional link 230). The carrier aggregation mechanisms supported when using a contention-based radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 105-*b* may transmit OFDMA waveforms to the third UE 115-*c* using a bidirectional link 250 and may receive OFDMA waveforms, SC-FDMA waveforms, or resource block interleaved FDMA waveforms from the fourth UE 115-*c* using the bidirectional link 250. The bidirectional link 250 may be associated with the frequency F3 in the contention-based radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a contention-free radio frequency spectrum band.

In some examples, a transmitting apparatus such as one of the base stations 105 described with reference to FIGS. 1 and 2, or one of the UEs 115 described with reference to FIGS. 1 and 2, may contend for access to a channel of a contention-based radio frequency spectrum band (e.g., to a physical channel of the contention-based radio frequency spectrum band) based at least in part on a gating interval. In some examples, the gating interval may be synchronous and periodic. For example, the periodic gating interval may be synchronized with at least one boundary of an LTE/LTE-A radio interval. In other examples, the gating interval may be asynchronous. The gating interval may define the application of a contention-based protocol, such as a listen-before-talk (LBT) protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure or an enhanced CCA (eCCA) procedure. The outcome of the CCA procedure or eCCA procedure may indicate to the transmitting apparatus whether a channel of a contention-based radio frequency spectrum band is available or in use for the gating interval (e.g., an LBT radio frame or transmission burst). When a CCA procedure or eCCA procedure indicates the channel is available for a corresponding LBT radio frame or transmission burst (e.g., "clear" for use), the transmitting apparatus may reserve or use the channel of the contention-based radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
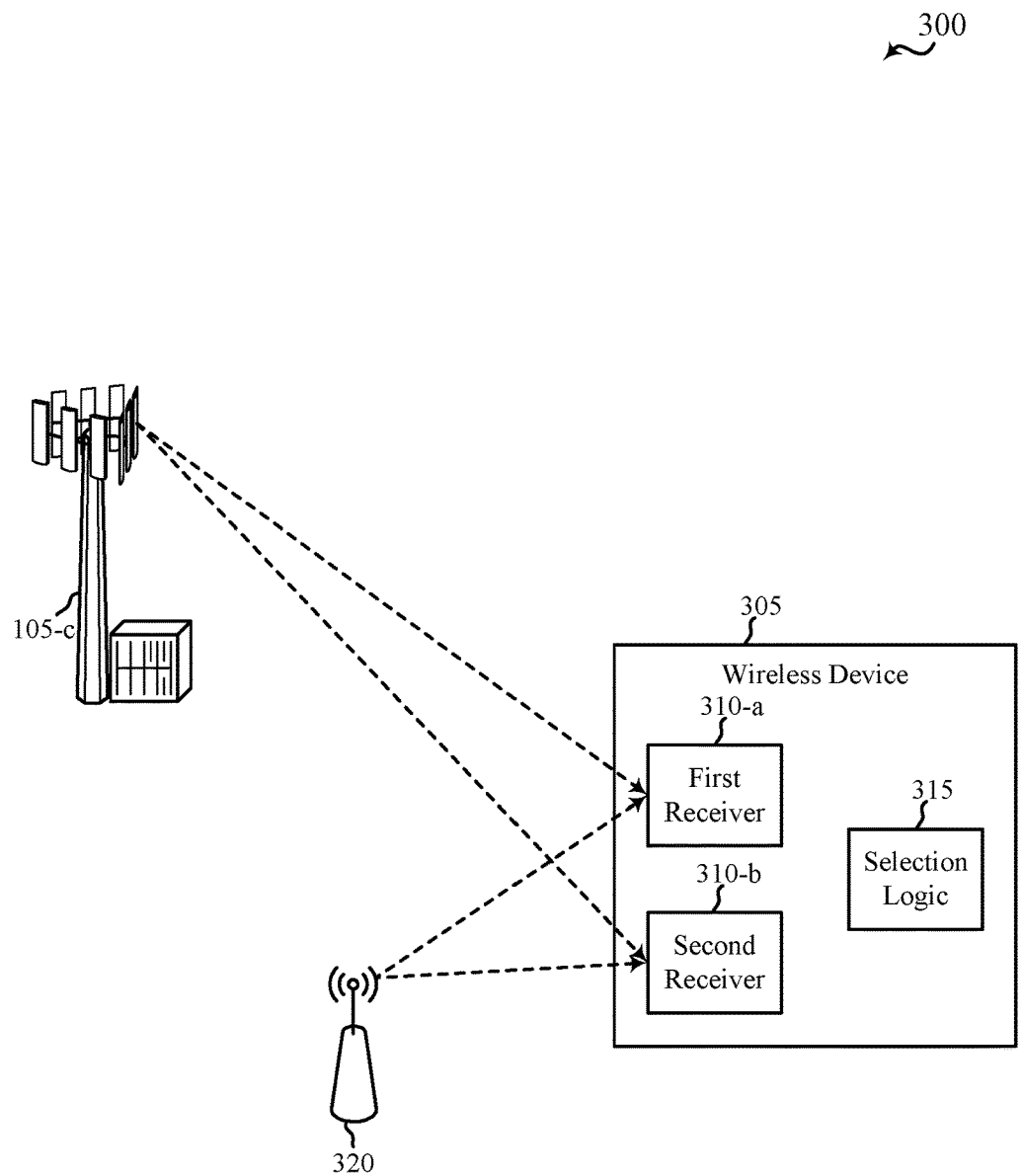
FIG. 3 shows a wireless communication system that includes a wireless device that may monitor a channel of a radio frequency spectrum band for signals of unknown signal strength, in accordance with various aspects of the present disclosure.

FIG. 3 shows a wireless communication system 300 that includes a wireless device 305 that may monitor a channel of a radio frequency spectrum band for signals of unknown signal strength, in accordance with various aspects of the present disclosure. In some examples, the wireless device 305 may be a wireless wide area network (WWAN) device, such as one of the base stations 105 or UEs 115 described with reference to FIGS. 1 and 2.

The wireless device 305 may include a plurality of receivers, including a first receiver 310-*a* and a second receiver 310-*b*. In some examples, the receivers may be wideband receivers capable of receiving signals over various radio frequency spectrum bands, including, for example, a contention-free radio frequency spectrum band (e.g., a radio frequency spectrum band for which transmitting devices may not contend for access because the radio frequency spectrum band is licensed to particular users for particular uses (e.g., a licensed radio frequency spectrum band usable for LTE/LTE-A communications)) or a contention-based radio frequency spectrum band (e.g., a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner)). In some examples, the contention-based radio frequency spectrum band may be used for LTE/LTE-A communications, as described, for example, with reference to FIGS. 1 and 2.

Each of the first receiver 310-a and the second receiver 310-b may have an adjustable gain state. In some cases, the receivers may be used in parallel to monitor a channel of a radio frequency spectrum band for a candidate information signal of unknown signal strength. In some examples, the candidate information signal may include a candidate Wi-Fi preamble. Prior to monitoring the channel, the first receiver 310-a may be set to a first fixed gain state (e.g., a low fixed gain state), and the second receiver 310-b may be set to a second fixed gain state (e.g., a high fixed gain state). A "fixed gain state" is a gain state that is not subjected to automatic gain control that varies the gain state. The first fixed gain state may provide the first receiver 310-a with a first dynamic range, and the second fixed gain state may provide the second receiver 310-b with a second dynamic range. The second dynamic range may partially overlap the first dynamic range to provide the wireless device 305 an extended dynamic range.

Receiver selection logic 315 may determine, during the monitoring, at least a first received signal strength of a first output of the first receiver 310-a, and a second received signal strength of a second receiver output of the second receiver 310-b. In some examples, the first received signal strength may include a first received signal strength indicator (RSSI), and the second received signal strength may include a second RSSI. The receiver selection logic 315 may also select, based on the first received signal strength and the second received signal strength, one or both of the first receiver output or the second receiver output for use in decoding the candidate information signal.

Based on the first received signal strength or the second received signal strength, one or both of the first fixed gain state of the first receiver 310-a or the second fixed gain state of the second receiver 310-b may be adjusted, so that both of the receivers may detect the signal (now of known strength) and provide the wireless device 305 with diversity in signal reception. The wireless device 305 may therefore use an extended dynamic range to detect a signal of unknown signal strength, and use diversity to improve signal reception after determining the signal's strength. Alternatively, a single receiver with a dynamic gain state (e.g., a gain state controlled by an AGC circuit) could be used to detect the signal of unknown signal strength. However, automatic gain control may be associated with an AGC convergence delay that can be avoided when using two receivers with fixed gain states, in parallel, to detect a signal of unknown signal strength.

In some examples, the wireless device 305 may monitor the channel of the radio frequency spectrum band while contending for access to the channel. For example, the channel may be a channel of a contention-based radio frequency spectrum band, and the wireless device 305 may contend for access to the channel for the purpose of communicating over the channel according to one or more of the scenarios described with reference to FIG. 2. More particularly, if the wireless device 305 is a UE 115 attempting to communicate with the base station 105-c over a channel of a contention-based radio frequency spectrum band, the wireless device 305 may perform an LBT, CCA, or eCCA procedure in which the wireless device monitors the channel for use by other devices, such as Wi-Fi device 320, for example. While monitoring the channel, the wireless device 305 may monitor the channel for energy on the channel (e.g., a received signal strength satisfying an energy threshold) or an energy signature on the channel (e.g., a pattern of received signal strengths). Upon detecting energy satisfying the energy threshold on the channel, the wireless device 305 may refrain from accessing the channel for a period of time. Upon detecting an energy signature representing a candidate information signal, the wireless device 305 may decode the candidate information signal. If the candidate information includes a network allocation vector (NAV) (e.g., a Wi-Fi preamble including a NAV), the wireless device 305 may refrain from accessing the channel for a period of time indicated by the NAV. Upon not detecting energy satisfying the energy threshold, the wireless device 305 may access the channel.

Figure 4A:
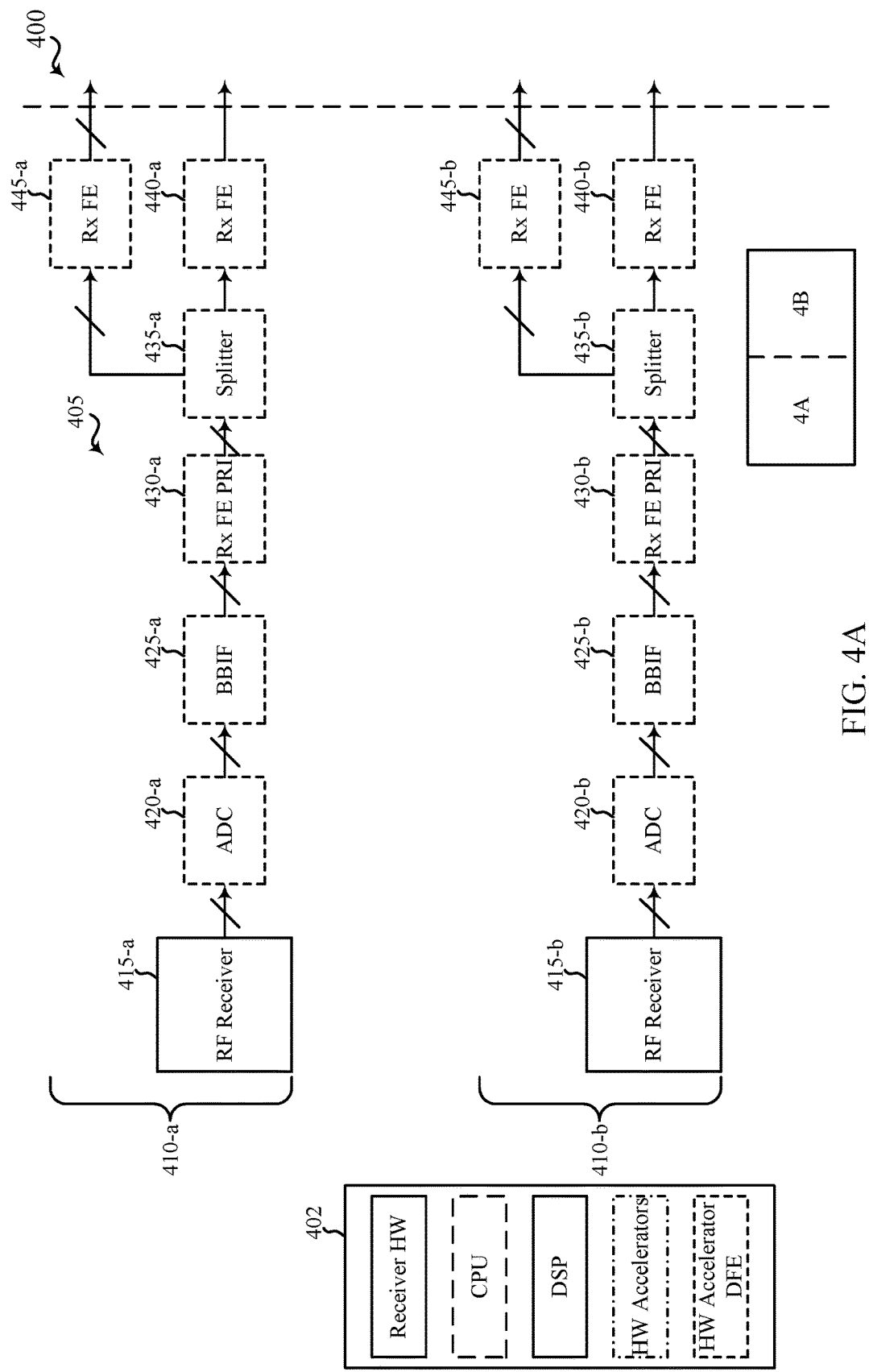
FIGS. 4A and 4B show a block diagram of an apparatus used for wireless communication, in accordance with various aspects of the present disclosure.
Figure 4B:
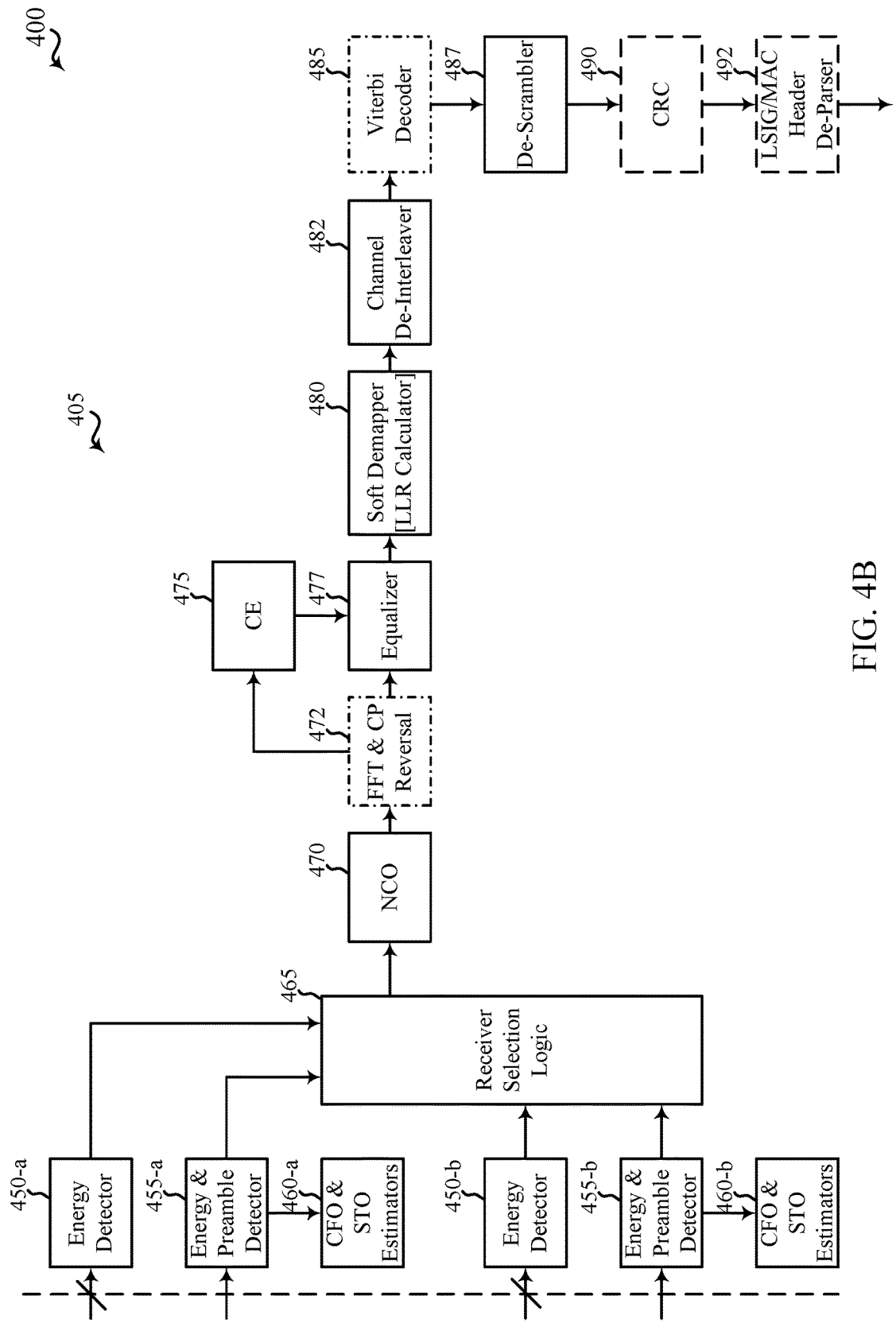

FIGS. 4A and 4B show a block diagram 400 of an apparatus 405 used for wireless communication, in accordance with various aspects of the present disclosure. The apparatus 405 may be an example of aspects of one or more of the base stations 105 or UEs 115 described with reference to FIGS. 1 and 2, or aspects of the wireless device 305 described with reference to FIG. 3. The apparatus 405 may include a first receiver 410-a and a second receiver 410-b, as shown in FIG. 4A, which may be examples of the first receiver 310-a and the second receiver 310-b described with reference to FIG. 3.

Each of the first receiver 410-a and the second receiver 410-b may include a number of similar components, such as a first radio frequency (RF) receiver 415-a or a second RF receiver 415-b, a first analog-to-digital converter (ADC) 420-a or a second ADC 420-b, a first baseband interface (BBIF) component 425-a or a second BBIF component 425-b, a first receiver (Rx) front-end (FE) PRI 430-a or a second receiver FE PRI 430-a, a first channel splitter 435-a or a second channel splitter 435-b, a first Rx FE component 440-a or a second Rx FE component 440-b for a primary CC, and/or a first Rx FE component 445-a or a second Rx FE component 445-b for each extended CC. Each of the first Rx FE components 440-a and 445-a may provide a first receiver output per channel, and each of the second Rx FE components 440-b and 445-b may provide a second receiver output per channel. In some examples, a primary channel of the radio frequency spectrum band may carry a primary CC of a Wi-Fi transmission, and one or more optional extended carriers of the radio frequency spectrum band may carry one or more extended CCs of the Wi-Fi transmission.

Turning to FIG. 4B, each receiver output corresponding to an extended CC may be received by a first energy detector 450-a per channel or a second energy detector 450-b per channel, and each receiver output corresponding to a primary CC may be received by a first energy and preamble detector 455-a or a second energy and preamble detector 455-b. Each of the first energy detector 450-a per channel and the second energy detector 450-b per channel may be used to detect whether the energy on a respective channel satisfies an energy threshold. In some examples, the energy on a channel may be estimated based at least in part on a received signal strength (e.g., based on an RSSI).

In some examples, the first energy detector 450-*a* per channel or the second energy detector 450-*b* per channel may indicate that energy is detected on a channel when the energy level on the channel exceeds an energy threshold at any time during a contention window. In some examples, the first energy detector 450-*a* per channel or the second energy detector 450-*b* per channel may indicate that energy is detected on a channel when the average energy level on the channel during the contention window exceeds an average energy threshold. The first energy detector 450-*a* per channel and the second energy detector 450-*b* per channel may provide energy detection indicators to receiver selection logic 465. The first energy detector 450-*a* per channel may also provide first received signal strengths (e.g., first RSSIs) per channel to the receiver selection logic 465, and the second energy detector 450-*b* per channel may provide second received signal strengths (e.g., second RSSIs) per channel to the receiver selection logic 465.

Each of the first energy and preamble detector 455-*a* and the second energy and preamble detector 455-*b* may be used to detect whether the energy on the primary channel satisfies an energy threshold and/or to detect whether the energy defines an energy signature representative of a candidate information signal (e.g., a Wi-Fi preamble). In some examples, the energy on the primary channel may be estimated based at least in part on a received signal strength (e.g., based at least in part on an RSSI). In some examples, the first energy and preamble detector 455-*a* or the second energy and preamble detector 455-*b* may indicate that energy is detected on the primary channel when the energy level on the primary channel exceeds an energy threshold at any time during a contention window. In some examples, the first energy and preamble detector 455-*a* or the second energy and preamble detector 455-*b* may indicate that energy is detected on the primary channel when the average energy level on the primary channel during the contention window exceeds an average energy threshold.

In some examples, the first energy and preamble detector 455-*a* or the second energy and preamble detector 455-*b* may indicate that an energy signature is detected on the primary channel upon detecting an energy satisfying an energy threshold for a predetermined period of time, or upon detecting an average energy satisfying an average energy threshold for the predetermined period of time. The first energy and preamble detector 455-*a* and the second energy and preamble detector 455-*b* may provide energy detection indicators and preamble detection indicators to the receiver selection logic 465. The first energy and preamble detector 455-*a* may also provide a first received signal strength (e.g., a first RSSI) to the receiver selection logic 465, and the second energy and preamble detector 455-*b* may provide a second received signal strength (e.g., a second RSSI) to the receiver selection logic 465.

In some examples, determining a received signal strength for a receiver output (or channel) may include determining an RSSI based on digitized power samples (DigiPowers). In some examples, an $RSSI_{i,j}$ may be determined for a receiver output i and a channel j as:

$RSSI_{i,j} = 10 \log_{10} P_{i,j} + 10 \log_{10} G_{i,j} - f(P_{i,j})$ where P is a DigiPower, G is a fixed gain, and f(P) is a correction term. When a receiver output for a channel is not saturated, f(P)=0. When a receiver output for a channel is saturated, the DigiPowers underestimate (e.g., compresses) the actual received power and the term f(P) compensates for the underestimation. In some examples, an $RSSI_{i,j}$ may be determined (computed) analytically, using a lookup table (LUT).

In some examples, the first energy and preamble detector 455-*a* or the second energy and preamble detector 455-*b* may indicate detection of an energy signature representing a Wi-Fi preamble based on the equation:

$PD_{flag} = (M_i > T \& P_i > DP_i^{min})$ where i is an index associated with a first receiver output for the primary channel or a second receiver output for the primary channel, where $DP_i^{min} = ED^{min} * IG_i$, where $E_{min} = 82$ dBm (linear), where $IG_i$ may be the same parameters used by the energy detectors 450 for energy detection, and where $DP_i^{min}$ is a maximum sensitivity level. At a sample time n, where $y_i(n)$ is the time domain input of the receiver output i, $X_i(n)$, $P_i(n)$ (a DigiPower), and $M_i(n)$ (a preamble detection metric) may be determined as follows:

$$X_i(n) = \sum_{m=0}^{I-1} y_i(n+m) y_i^*(n+m-L)$$

$$P_i(n) = \frac{1}{2} \sum_{m=0}^{I-1} \{|y_i(n+m)|^2 + |y_i(n+m-L)|^2\}$$

$$M_i(n) = X_i(n) / P_i(n)$$

where L is a lag (e.g., 32 samples at 40 mega-samples per second (Msps) (0.8 microseconds (μsec))) and I is an integration length (e.g., 96 samples at 40 Msps (2.4 μsec)).

In some examples, each of the first receiver 410-*a* and the second receiver 410-*b* may be respectively associated with a first carrier frequency offset (CFO) and symbol timing offset (STO) estimator 460-*a* and a second CFO and STO estimator 460-*b*.

The receiver selection logic 465 may receive the energy detection indicators, received signal strengths (e.g., RSSIs), and energy signature detection indicators from the energy detectors 450 and energy and preamble detectors 455. In some examples, the receiver selection logic 465 may use the received indicators and/or received signal strengths to select one or both of an output of the first receiver 410-*a* (i.e., a first receiver output) or an output of the second receiver 410-*b* (i.e., a second receiver output) for use in decoding a candidate information signal. In some examples, the receiver selection logic 465 may compare the first received signal strength of the first receiver output to the second received signal strength of the second receiver output, or compare each of the first received signal strength and the second received signal strength to a saturation threshold (if not already done, for example, by the energy and preamble detectors 455). The receiver selection logic 465 may then select a receiver output having a greatest received signal strength below the saturation threshold. Alternatively, the receiver selection logic 465 may identify at least one receiver output associated with a received signal strength below the saturation threshold; and select, from the identified at least one receiver output, a receiver output having a highest gain state. Alternatively, the receiver selection logic 465 may determine all receiver outputs exceed the saturation threshold; and select a receiver output having a lowest received signal strength.

After selecting a receiver output for use in decoding a candidate information signal, the receiver output may be processed and decoded using a receive chain including, for example, a number-controlled oscillator (NCO) 470, a fast Fourier transform (FFT) and cyclic prefix (CP) remover 472, a channel estimator (CE) 475, an equalizer 477, a soft demapper (e.g., a log-likelihood ratio (LLR) calculator) 480, a channel de-interleaver 482, a Viterbi decoder 485, a de-scrambler 487, a cyclic redundancy check (CRC) determiner 490, and/or a legacy signal (LSIG)/MAC header de-parser 495.

The components described with reference to FIGS. 4A and 4B may be variously implemented by receiver hardware (HW), a central processing unit (CPU), a digital signal processor (DSP), one or more HW accelerators, one or more HW accelerator digital front ends (DFEs), and/or other components. An example implementation of the components of FIGS. 4A and 4B is described in a legend 402 associated with FIGS. 4A and 4B.

Figure 5:
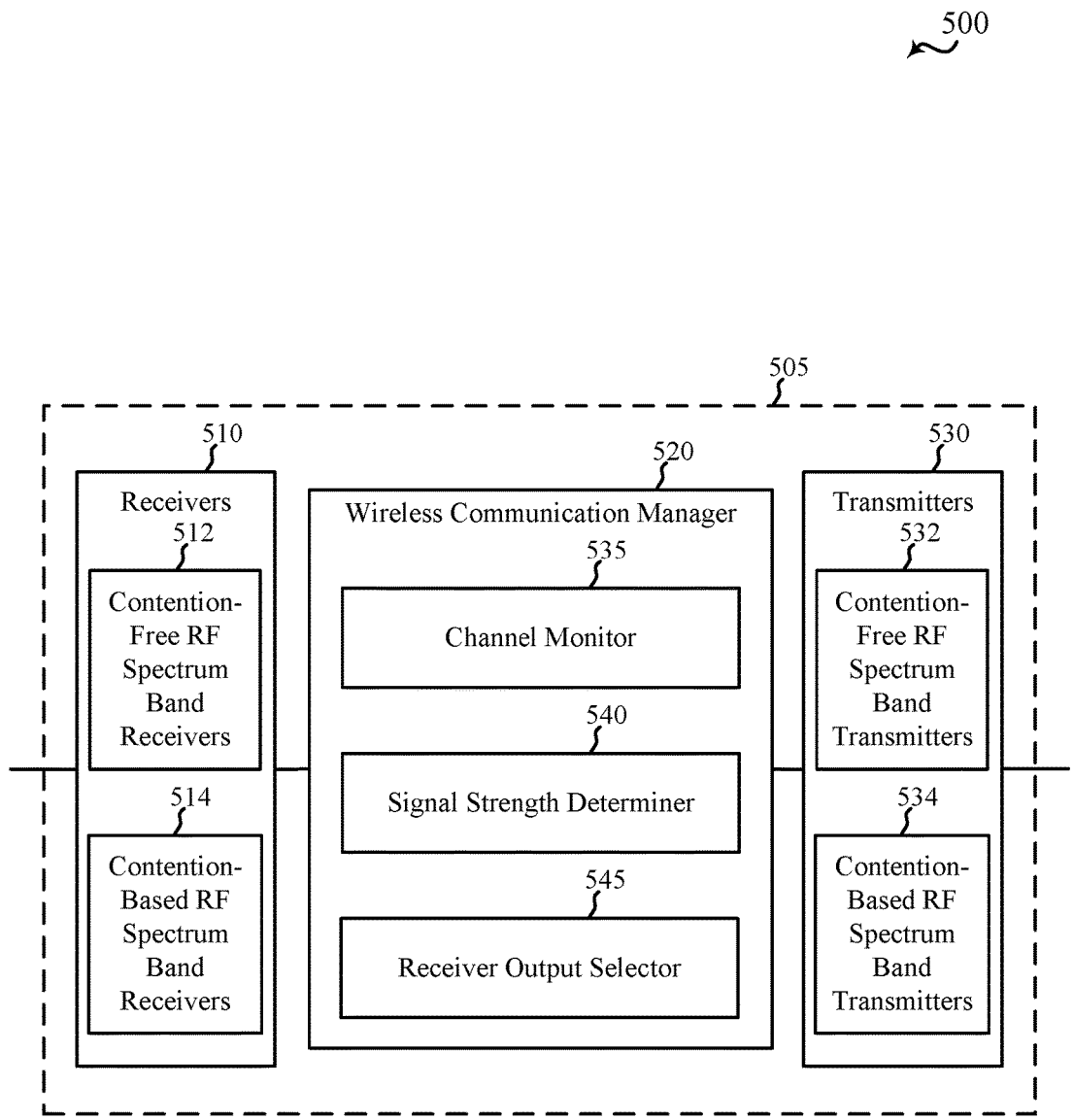
FIG. 5 shows a block diagram of an apparatus for use in wireless communication at a wireless device, in accordance with various aspects of the present disclosure.

FIG. 5 shows a block diagram 500 of an apparatus 505 for use in wireless communication at a wireless device, in accordance with various aspects of the present disclosure. The apparatus 505 may be an example of aspects of one or more of the base stations 105 or UEs 115 described with reference to FIGS. 1 and 2, or aspects of the wireless device 305 described with reference to FIG. 3. The apparatus 505 may also be or include a processor. The apparatus 505 may include receivers 510, a wireless communication manager 520, or transmitters 530. Each of these components may be in communication with each other.

The components of the apparatus 505 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., structured/platform ASICs, field programmable gate arrays (FPGAs), a system on chip (SoC), and/or other types of semi-custom ICs), which may be programmed in any manner known in the art. The functions of each module may also be implemented, in whole or in part, with instructions embodied in a memory, formatted to be executed by one or more general or application-specific processors.

In some examples, the receivers 510 may include RF receivers, such as a number of RF receivers operable to receive transmissions over a contention-free radio frequency spectrum band (e.g., a radio frequency spectrum band for which transmitting devices may not contend for access because the radio frequency spectrum band is licensed to particular users for particular uses (e.g., a licensed radio frequency spectrum band usable for LTE/LTE-A communications)) or a contention-based radio frequency spectrum band (e.g., a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner)).

In some examples, the contention-free radio frequency spectrum band or the contention-based radio frequency spectrum band may be used for LTE/LTE-A communications, as described, for example, with reference to FIGS. 1, 2 and 3. The receivers 510 may in some cases include separate receivers for the contention-free radio frequency spectrum band and the contention-based radio frequency spectrum band. The separate receivers may, in some examples, take the form of contention-free RF spectrum band receivers 512 for communicating over the contention-free radio frequency spectrum band, and contention-based RF spectrum band receivers 514 for communicating over the contention-based radio frequency spectrum band. In some examples, a single receiver may be tunable to communicate over the contention-free RF spectrum band or the contention-based RF spectrum band.

The receivers 510, including the contention-free RF spectrum band receivers 512 or the contention-based RF spectrum band receivers 514, may be used to receive various data or control signals (i.e., transmissions) over one or more communication links of a wireless communication system, such as one or more communication links of the wireless communication system 100, 200, or 300 described with reference to FIGS. 1-3. The contention-based RF spectrum band receivers 514 may also be used to monitor an energy on the contention-based radio frequency spectrum band. The communication links may be established over the contention-free radio frequency spectrum band or the contention-based radio frequency spectrum band.

In some examples, the transmitters 530 may include RF transmitters, such as a number of RF transmitters operable to transmit over the contention-free radio frequency spectrum band or the contention-based radio frequency spectrum band. The transmitters 530 may in some cases include separate transmitters for the contention-free radio frequency spectrum band and the contention-based radio frequency spectrum band. The separate transmitters may, in some examples, take the form of contention-free RF spectrum band transmitters 532 for communicating over the contention-free radio frequency spectrum band, and contention-based RF spectrum band transmitters 534 for communicating over the contention-based radio frequency spectrum band.

In some examples, a single transmitter may be tunable to communicate over the contention-free RF spectrum band or the contention-based RF spectrum band. The transmitters 530, including the contention-free RF spectrum band transmitters 532 or the contention-based RF spectrum band transmitters 534, may be used to transmit various data or control signals (i.e., transmissions) over one or more communication links of a wireless communication system, such as one or more communication links of the wireless communication system 100, 200, or 300 described with reference to FIGS. 1-3. The communication links may be established over the contention-free radio frequency spectrum band or the contention-based radio frequency spectrum band.

In some examples, the wireless communication manager 520 may be used to manage one or more aspects of wireless communication for the apparatus 505. In some examples, the wireless communication manager 520 may include a channel monitor 535, a signal strength determiner 540, or a receiver output selector 545.

The channel monitor 535 may be used to monitor a channel of a radio frequency spectrum band using at least a first receiver and a second receiver (of the receivers 510) in parallel. The first receiver may be set to a first fixed gain state, and the second receiver may be set to a second fixed gain state. The first fixed gain state may provide the first receiver with a first dynamic range, and the second fixed gain state may provide the second receiver with a second dynamic range. The second dynamic range may partially overlap the first dynamic range to provide the wireless device an extended dynamic range. In some examples, the channel of the radio frequency spectrum band may be shared by cellular radio devices and Wi-Fi devices (e.g., the channel may be a channel of the contention-based radio frequency spectrum band).

The signal strength determiner 540 may be used to determine, during the monitoring, at least a first received signal strength of a first receiver output of the first receiver, and a second received signal strength of a second receiver output of the second receiver. In some examples, the first received signal strength may include a first RSSI, and the second received signal strength may include a second RSSI. In some examples, the candidate information signal may include a candidate Wi-Fi preamble. The receiver output selector 545 may be used to select, based at least in part on the first received signal strength and the second received signal strength, one or both of the first receiver output or the second receiver output for use in decoding a candidate information signal.

Figure 6:
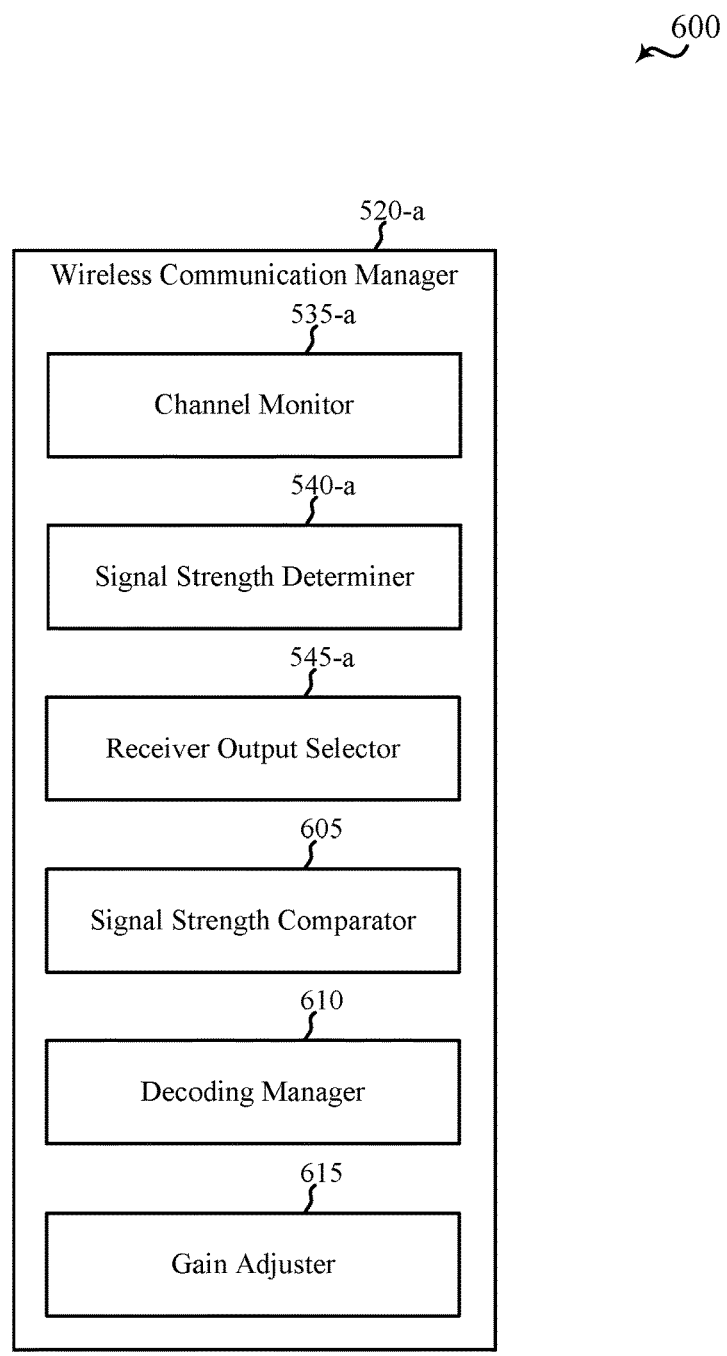
FIG. 6 shows a block diagram of a wireless communication manager, in accordance with various aspects of the present disclosure.

FIG. 6 shows a block diagram 600 of a wireless communication manager 520-a, in accordance with various aspects of the present disclosure. The wireless communication manager 520-a may be an alternative to the wireless communication manager 520 described with reference to FIG. 5, or may be provided in one or more of the base stations 105 or UEs 115 described with reference to FIGS. 1 and 2 or the wireless device 305 described with reference to FIG. 3. The wireless communication manager 520-a may be used to manage one or more aspects of wireless communication for a wireless device (e.g., a base station or UE). In some examples, part of the wireless communication manager 520-a may be incorporated into or shared with one or more receivers or transmitters of a wireless device, such as the receivers 510 or transmitters 530 of the apparatus 505 described with reference to FIG. 5. In some examples, the wireless communication manager 520-a may include a channel monitor 535-a, a signal strength determiner 540-a, or a receiver output selector 545-a, which may be examples of the channel monitor 535, signal strength determiner 540, or receiver output selector 545 described with reference to FIG. 5. The wireless communication manager 520-a may also include a signal strength comparator 605, a decoding manager 610, or a gain adjuster 615.

The components of the wireless communication manager 520-a may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., structured/platform ASICs, FPGAs, a SoC, and/or other types of semi-custom ICs), which may be programmed in any manner known in the art. The functions of each component may also be implemented, in whole or in part, with instructions embodied in a memory, formatted to be executed by one or more general or application-specific processors.

The channel monitor 535-a may be used to monitor a channel of a radio frequency spectrum band using at least a first receiver and a second receiver in parallel. The first receiver may be set to a first fixed gain state, and the second receiver may be set to a second fixed gain state. The first fixed gain state may provide the first receiver with a first dynamic range, and the second fixed gain state may provide the second receiver with a second dynamic range. The second dynamic range may partially overlap the first dynamic range to provide the wireless device an extended dynamic range. In some examples, the channel of the radio frequency spectrum band may be shared by cellular radio devices and Wi-Fi devices.

The signal strength determiner 540-a may be used to determine, during the monitoring, at least a first received signal strength of a first receiver output of the first receiver, and a second received signal strength of a second receiver output of the second receiver. In some examples, the first received signal strength may include a first RSSI, and the second received signal strength may include a second RSSI. In some examples, the candidate information signal may include a candidate Wi-Fi preamble. The signal strength comparator 605 may be used to compare one or more of: the first received signal strength to the second received signal strength, or the first received signal strength to a saturation threshold, or the second signal strength to the saturation threshold.

The receiver output selector 545-a may be used to select, based at least in part on the first received signal strength and the second received signal strength, one or both of the first receiver output or the second receiver output for use in decoding a candidate information signal. In some examples, the receiver output selector 545-a may select a receiver output having a greatest received signal strength below the saturation threshold. In some examples, the receiver output selector 545-a may identify at least one receiver output associated with a received signal strength below the saturation threshold, and select, from the identified at least one receiver output, a receiver output of a receiver having a highest fixed gain state. In some examples, the receiver output selector 545-a may determine all receiver outputs exceed the saturation threshold, and select a receiver output having a lowest received signal strength.

The decoding manager 610 may be used to decode the candidate information signal. The gain adjuster 615 may be used to adjust, based at least in part on the first received signal strength or the second received signal strength, one or both of: the first fixed gain state, or the second fixed gain state. In some examples, the adjusting may include setting the first fixed gain state and the second fixed gain state to a same fixed gain state.

Figure 7:
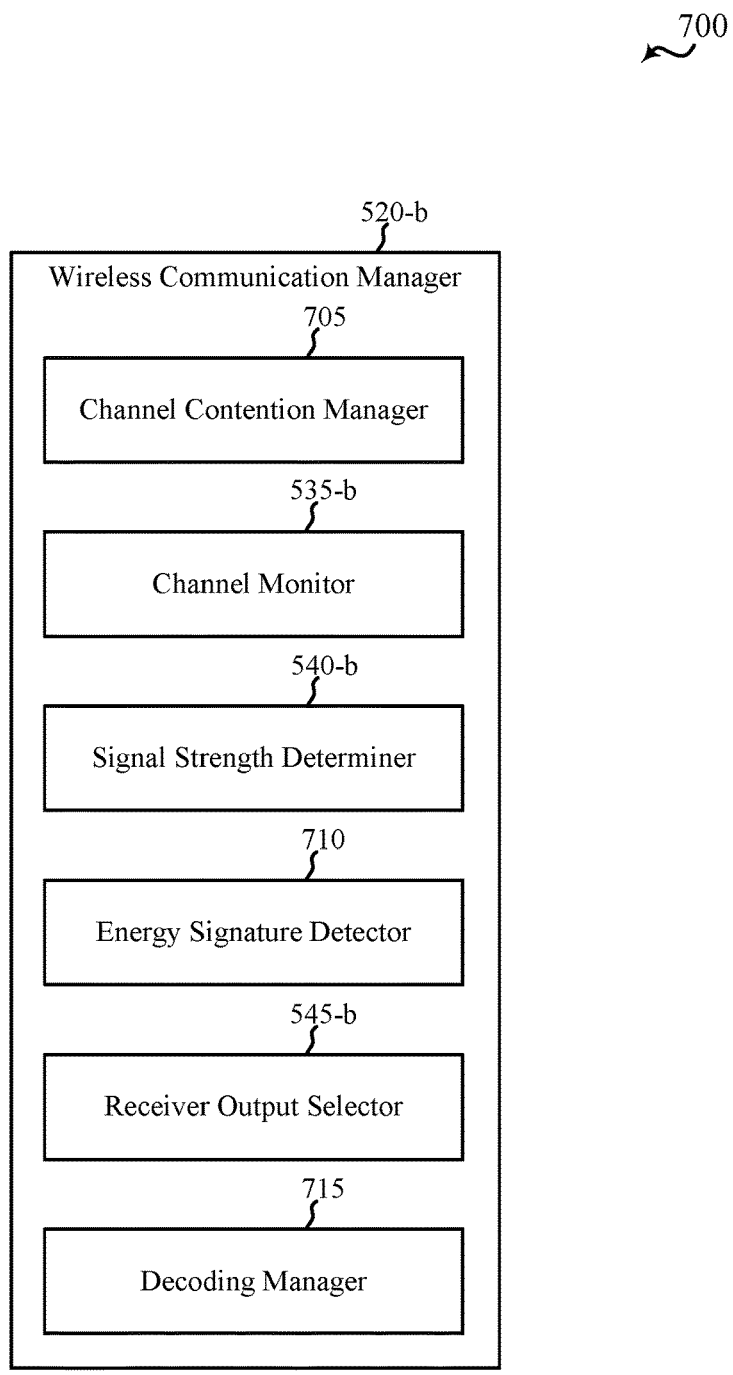
FIG. 7 shows a block diagram of a wireless communication manager, in accordance with various aspects of the present disclosure.

FIG. 7 shows a block diagram 700 of a wireless communication manager 520-b, in accordance with various aspects of the present disclosure. The wireless communication manager 520-b may be an alternative to the wireless communication manager 520 described with reference to FIG. 5 or 6, or may be provided in one or more of the base stations 105 or UEs 115 described with reference to FIGS. 1 and 2 or the wireless device 305 described with reference to FIG. 3. The wireless communication manager 520-b may be used to manage one or more aspects of wireless communication for a wireless device (e.g., a base station 105 or UE 115). In some examples, part of the wireless communication manager 520-b may be incorporated into or shared with one or more receivers or transmitters of a wireless device, such as the receivers 510 or transmitters 530 of the apparatus 505 described with reference to FIG. 5. In some examples, the wireless communication manager 520-b may include a channel monitor 535-b, a signal strength determiner 540-b, or a receiver output selector 545-b, which may be examples of the channel monitor 535, signal strength determiner 540, or receiver output selector 545 described with reference to FIG. 5. The wireless communication manager 520-b may also include a channel contention manager 705, an energy signature detector 710, or a decoding manager 715.

The components of the wireless communication manager 520-b may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., structured/platform ASICs, FPGAs, a SoC, and/or other types of semi-custom ICs), which may be programmed in any manner known in the art. The functions of each component may also be implemented, in whole or in part, with instructions embodied in a memory, formatted to be executed by one or more general or application-specific processors.

The channel contention manager 705 may manage contention for access to a channel of a radio frequency spectrum band. In some examples, the channel of the radio frequency spectrum band may be shared by cellular radio devices and Wi-Fi devices. In some examples, the channel contention manager 705 may refrain from enabling a wireless device to access the channel of the radio frequency spectrum band, based at least in part on detecting energy on the channel, or detecting an energy signature of a candidate information signal received on the channel, or decoding a candidate information signal. In some examples, the channel contention manager 705 may enable a wireless device to access the channel of the radio frequency spectrum band, based at least in part on not detecting energy on the channel, and not detecting an energy signature of a candidate information signal on the channel.

The channel monitor 535-b may be used to monitor the channel of the radio frequency spectrum band using at least a first receiver and a second receiver in parallel, while contending for access to the channel of the radio frequency spectrum band. The first receiver may be set to a first fixed gain state, and the second receiver may be set to a second fixed gain state. The first fixed gain state may provide the first receiver with a first dynamic range, and the second fixed gain state may provide the second receiver with a second dynamic range. The second dynamic range may partially overlap the first dynamic range to provide the wireless device an extended dynamic range.

The signal strength determiner 540-b may be used to determine, during the monitoring, at least a first received signal strength of a first receiver output of the first receiver, and a second received signal strength of a second receiver output of the second receiver. In some examples, the first received signal strength may include a first RSSI, and the second received signal strength may include a second RSSI. In some examples, the candidate information signal may include a candidate Wi-Fi preamble.

The energy signature detector 710 may optionally be used to detect, based at least in part on the first receiver output or the second receiver output, an energy signature representing the candidate information signal. In some examples, detecting the energy signature may include one or both of: detecting an energy satisfying an energy threshold for a predetermined period of time, or detecting an average energy satisfying an average energy threshold for the predetermined period of time, or detecting a Wi-Fi preamble.

The receiver output selector 545-b may be used to select, based at least in part on the first received signal strength and the second received signal strength, one or both of the first receiver output or the second receiver output for use in decoding a candidate information signal. In some examples, the selection may further be based at least in part on detecting the energy signature representing the candidate information signal.

The decoding manager 715 may be used to decode the candidate information signal. In some examples, the decoding may include obtaining a NAV. In some examples, the channel contention manager 705 may refrain from accessing the channel of the radio frequency spectrum band for a period of time indicated by the NAV.

Figure 8:
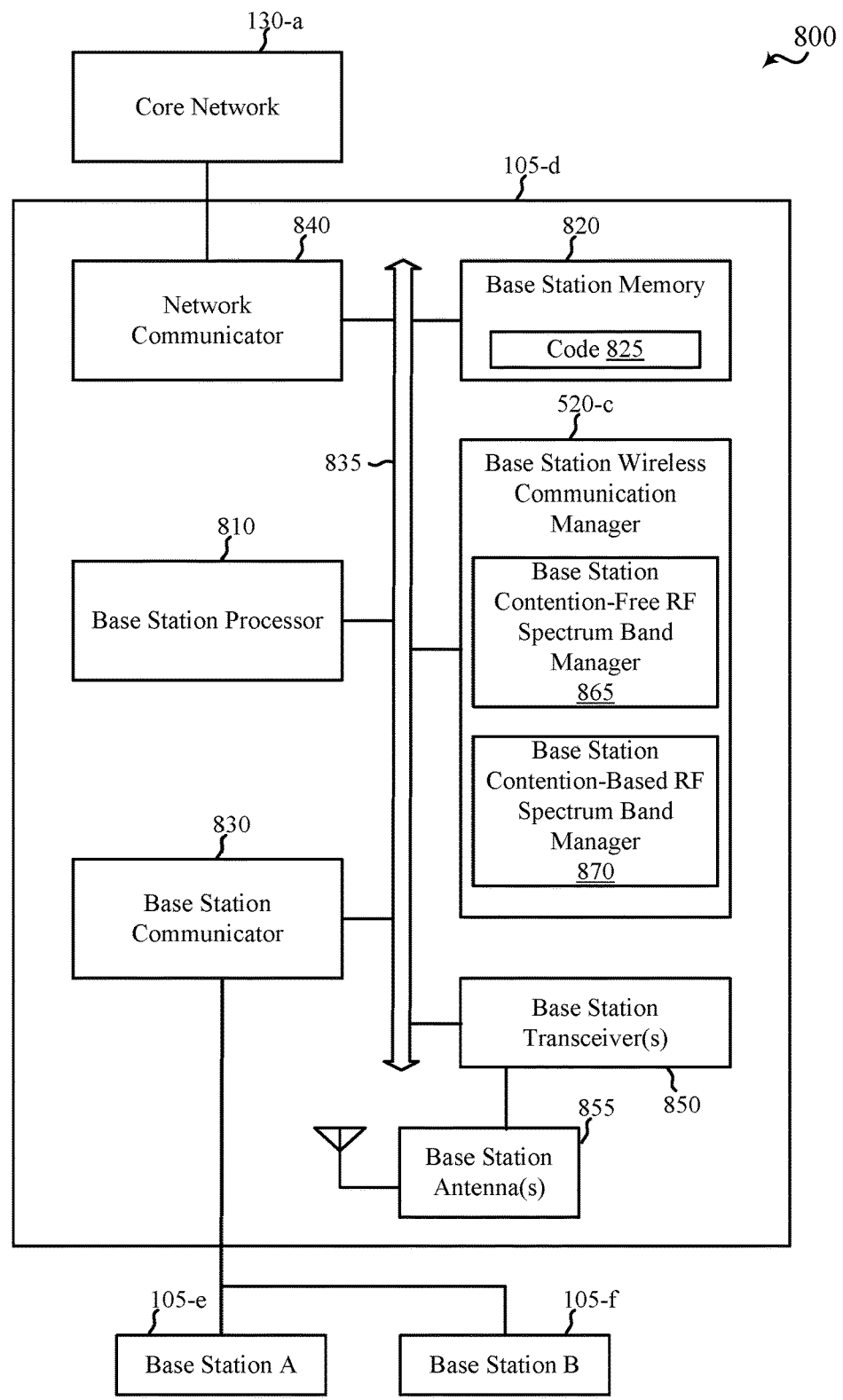
FIG. 8 shows a diagram of a base station (e.g., a base station forming part or all of an eNB) for use in wireless communication, in accordance with various aspects of the present disclosure.

FIG. 8 shows a diagram 800 of a base station 105-d (e.g., a base station forming part or all of an eNB) for use in wireless communication, in accordance with various aspects of the present disclosure. In some examples, the base station 105-d may be an example of aspects of one or more of the base stations 105 described with reference to FIGS. 1 and 2, or aspects of the wireless device 305 described with reference to FIG. 3. The base station 105-d may be configured to implement or facilitate at least some of the base station features and functions described with reference to FIGS. 1-7.

The base station 105-d may include a base station processor 810, a base station memory 820, a set of base station transceivers 850, a set of base station antennas 855, or a base station wireless communication manager 520-c. The base station 105-d may also include one or more of a base station communicator 830 or a network communicator 840. Each of these components may be in communication with each other, directly or indirectly, over one or more buses 835.

The base station memory 820 may include random access memory (RAM) or read-only memory (ROM). The base station memory 820 may store computer-readable, computer-executable code 825 containing instructions executable by the base station processor 810 to perform various functions described herein related to wireless communication, including, for example, receiving a signal using first and second receivers set to different fixed gain states. Alternatively, the code 825 may not be directly executable by the base station processor 810 but be configured to cause the base station 105-d (e.g., when compiled and executed) to perform various of the functions described herein.

The base station processor 810 may include an intelligent hardware device, e.g., a central processing unit (CPU), a microcontroller, an ASIC, etc. The base station processor 810 may process information received through the base station transceivers 850, the base station communicator 830, or the network communicator 840. The base station processor 810 may also process information to be sent to the base station transceivers 850 for transmission through the base station antennas 855, to the base station communicator 830, for transmission to one or more other base stations 105-e and 105-f, or to the network communicator 840 for transmission to a core network 130-a, which may be an example of one or more aspects of the core network 130 described with reference to FIG. 1.

The base station processor 810 may handle, alone or in connection with the base station wireless communication manager 520-c, various aspects of communicating over (or managing communications over) one or more radio frequency spectrum bands, such as a contention-free radio frequency spectrum band (e.g., a radio frequency spectrum band for which transmitting devices may not contend for access because the radio frequency spectrum band is licensed to particular users for particular uses (e.g., a licensed radio frequency spectrum band usable for LTE/LTE-A communications)) or a contention-based radio frequency spectrum band (e.g., a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner)).

The base station transceivers 850 may include at least one modem configured to modulate packets and provide the modulated packets to the base station antennas 855 for transmission, and to demodulate packets received from the base station antennas 855. The base station transceivers 850 may, in some examples, be implemented as a set of base station transmitters and a separate set of base station receivers. The base station transceivers 850 may support communications in the one or more radio frequency spectrum bands. The base station transceivers 850 may be configured to communicate bi-directionally, via the base station antennas 855, with one or more UEs 115, such as one or more of the UEs 115 described with reference to FIGS. 1-2, the wireless device 305 described with reference to FIG. 3, or the apparatus 505 described with reference to FIG. 5. The base station 105-d may communicate with the core network 130-a through the network communicator 840. The base station 105-d may also communicate with other base stations, such as the base stations 105-e and 105-f, using the base station communicator 830.

The base station wireless communication manager 520-c may be configured to program, control, or otherwise manage some or all of the features or functions described with reference to FIGS. 1-7 related to wireless communication. In some examples, the base station wireless communication manager 520-c may include a base station contention-free RF spectrum band manager 865 configured to handle communications in the contention-free radio frequency spectrum band, and a base station contention-based RF spectrum band manager 870 configured to handle communications in the contention-based radio frequency spectrum band. The base station wireless communication manager 520-c, or portions of it, may include a processor, or some or all of the functions of the base station wireless communication manager 520-c may be performed by the base station processor 810 or in connection with the base station processor 810. In some examples, the base station wireless communication manager 520-c may be an example of the wireless communication manager 520 described with reference to FIGS. 5-7.

Figure 9:
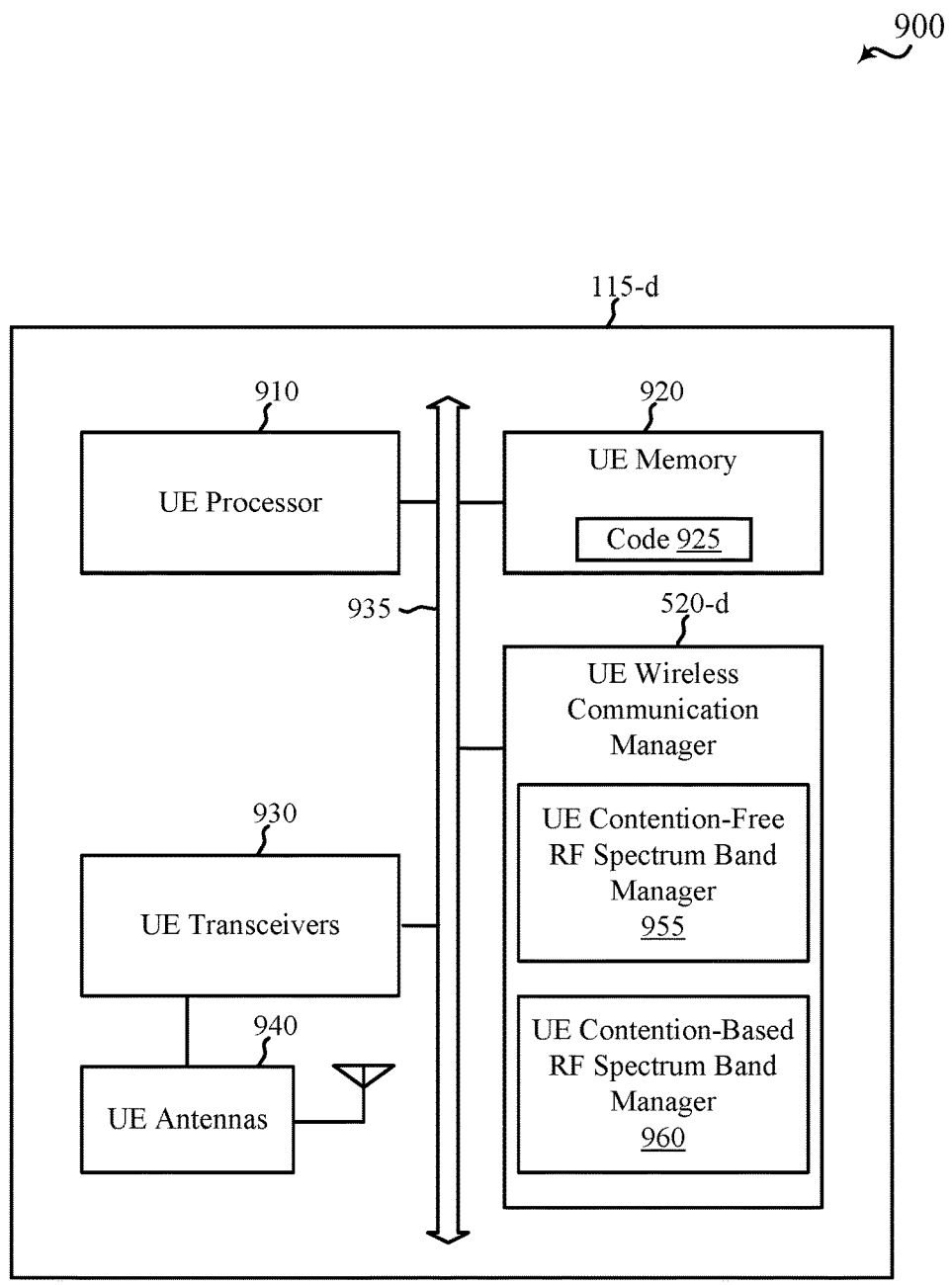
FIG. 9 shows a diagram of a user equipment (UE) for use in wireless communication, in accordance with various aspects of the present disclosure.

FIG. 9 shows a diagram 900 of a UE 115-d for use in wireless communication, in accordance with various aspects of the present disclosure. The UE 115-d may have various configurations and may be a wireless communication device, a personal computer (e.g., a laptop computer, a netbook computer, a tablet computer, etc.), a handheld device, a cellular telephone, a smart phone, a cordless phone, a wireless modem, a wireless local loop (WLL) station, a personal digital assistant (PDA), a digital video recorder (DVR), an internet appliance, a gaming console, an e-reader, etc. The UE 115-d may, in some examples, have an internal power supply (not shown), such as a small battery, to facilitate mobile or remote operation. In some examples, the UE 115-d may be an example of aspects of one or more of the UEs 115 described with reference to FIGS. 1 and 2, or aspects of the wireless device 305 described with reference to FIG. 3. The UE 115-d may be configured to implement at least some of the UE features and functions described with reference to FIGS. 1-7.

The UE 115-d may include a UE processor 910, a UE memory 920, a set of UE transceivers 930, a set of UE antennas 940, or a UE wireless communication manager 520-d. Each of these components may be in communication with each other, directly or indirectly, over one or more buses 935.

The UE memory 920 may include RAM or ROM. The UE memory 920 may store computer-readable, computer-executable code 925 containing instructions executable by the UE processor 910 to perform various functions described herein related to wireless communication, including, for example, receiving a signal using first and second receivers set to different fixed gain states. Alternatively, the code 925 may not be directly executable by the UE processor 910 but be configured to cause the UE 115-d (e.g., when compiled and executed) to perform various of the functions described herein.

The UE processor 910 may include an intelligent hardware device, e.g., a CPU, a microcontroller, an ASIC, etc. The UE processor 910 may process information received through the UE transceivers 930 or information to be sent to the UE transceivers 930 for transmission through the UE antennas 940. The UE processor 910 may handle, alone or in connection with the UE wireless communication manager 520-d, various aspects of communicating over (or managing communications over) one or more radio frequency spectrum bands, such as a contention-free radio frequency spectrum band (e.g., a radio frequency spectrum band for which transmitting devices may not contend for access because the radio frequency spectrum band is licensed to particular users for particular uses (e.g., a licensed radio frequency spectrum band usable for LTE/LTE-A communications)) or a contention-based radio frequency spectrum band (e.g., a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner)).

The UE transceivers 930 may include at least one modem configured to modulate packets and provide the modulated packets to the UE antennas 940 for transmission, and to demodulate packets received from the UE antennas 940. The UE transceivers 930 may, in some examples, be implemented as a set of UE transmitters and a separate set of UE receivers. The UE transceivers 930 may support communications in the one or more radio frequency spectrum bands. The UE transceivers 930 may be configured to communicate bi-directionally, via the UE antennas 940, with one or more base stations or other devices, such as one or more of the base stations 105 described with reference to FIGS. 1-3 and 8.

The UE wireless communication manager 520-d may be configured to program or control some or all of the features or functions described with reference to FIGS. 1-7 related to wireless communication. In some examples, the UE wireless communication manager 520-d may include a UE contention-free RF spectrum band manager 955 configured to handle communications in the contention-free radio frequency spectrum band, and a UE contention-based RF spectrum band manager 960 configured to handle communications in the contention-based radio frequency spectrum band. The UE wireless communication manager 520-d, or portions of it, may include a processor, or some or all of the functions of the UE wireless communication manager 520-d may be performed by the UE processor 910 or in connection with the UE processor 910. In some examples, the UE wireless communication manager 520-d may be an example of the wireless communication manager 520 described with reference to FIGS. 5-7.

Figure 10:
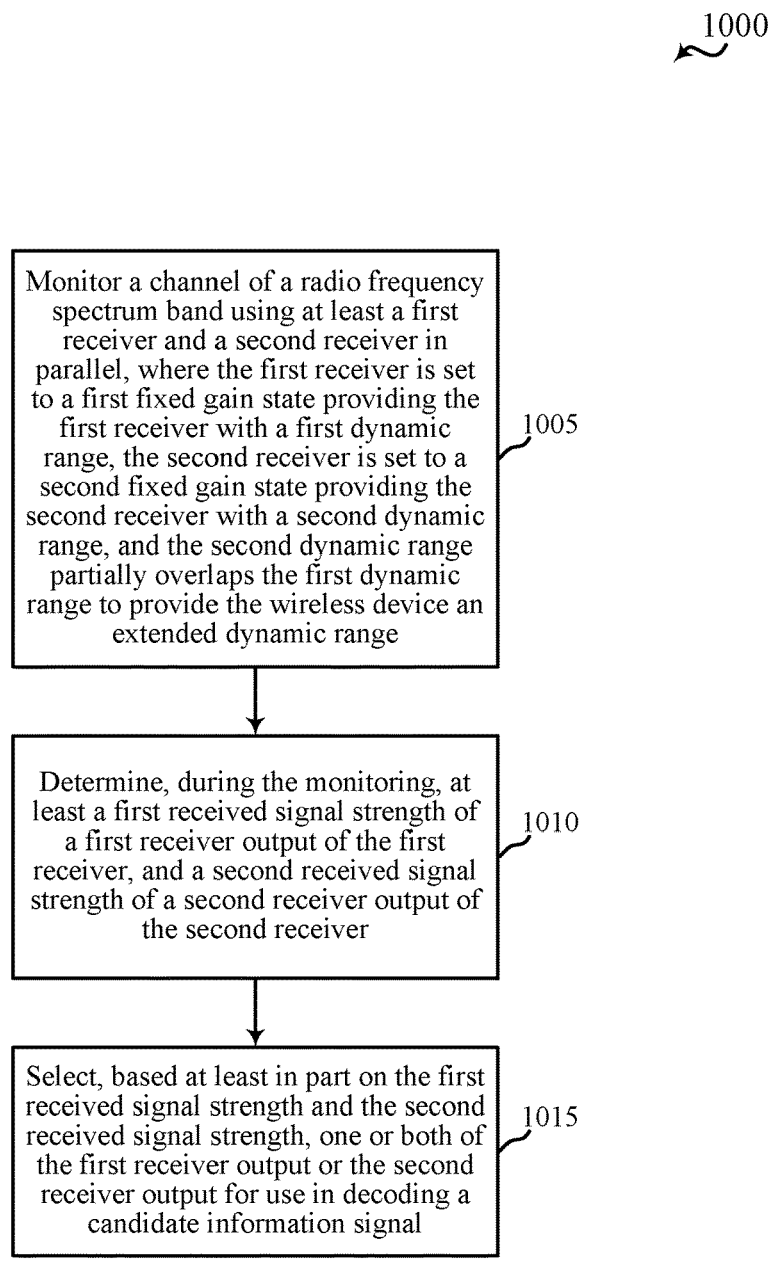
FIG. 10 is a flow chart illustrating an example of a method for wireless communication at a wireless device, in accordance with various aspects of the present disclosure.

FIG. 10 is a flow chart illustrating an example of a method 1000 for wireless communication at a wireless device, in accordance with various aspects of the present disclosure.

For clarity, the method 1000 is described below with reference to aspects of one or more of the base stations 105 described with reference to FIGS. 1, 2, and 8, aspects of one or more of the UEs 115 described with reference to FIGS. 1, 2, and 9, aspects of the wireless device 305 described with reference to FIG. 3, or aspects of the apparatus 505 described with reference to FIG. 5. In some examples, a wireless device (which may be, or be a part of, a base station 105 or UE 115) may perform one or more of the functions described below using special-purpose hardware.

At block 1005, the method 1000 may include monitoring a channel of a radio frequency spectrum band using at least a first receiver and a second receiver in parallel. The first receiver may be set to a first fixed gain state, and the second receiver may be set to a second fixed gain state. The first fixed gain state may provide the first receiver with a first dynamic range, and the second fixed gain state may provide the second receiver with a second dynamic range. The second dynamic range may partially overlap the first dynamic range to provide the wireless device an extended dynamic range. In some examples, the channel of the radio frequency spectrum band may be shared by cellular radio devices and Wi-Fi devices. The operation(s) at block 1005 may be performed using the wireless communication manager 520 described with reference to FIGS. 5-9, or the channel monitor 535 described with reference to FIGS. 5-7.

At block 1010, the method 1000 may include determining, during the monitoring, at least a first received signal strength of a first receiver output of the first receiver, and a second received signal strength of a second receiver output of the second receiver. In some examples, the first received signal strength may include a first RSSI, and the second received signal strength may include a second RSSI. In some examples, the candidate information signal may include a candidate Wi-Fi preamble. The operation(s) at block 1010 may be performed using the wireless communication manager 520 described with reference to FIGS. 5-9, or the signal strength determiner 540 described with reference to FIGS. 5-7.

At block 1015, the method 1000 may include selecting, based at least in part on the first received signal strength and the second received signal strength, one or both of the first receiver output or the second receiver output for use in decoding a candidate information signal. The operation(s) at block 1015 may be performed using the wireless communication manager 520 described with reference to FIGS. 5-9, or the receiver output selector 545 described with reference to FIGS. 5-7.

Thus, the method 1000 may provide for wireless communication. It should be noted that the method 1000 is just one implementation and that the operations of the method 1000 may be rearranged or otherwise modified such that other implementations are possible.

Figure 11:
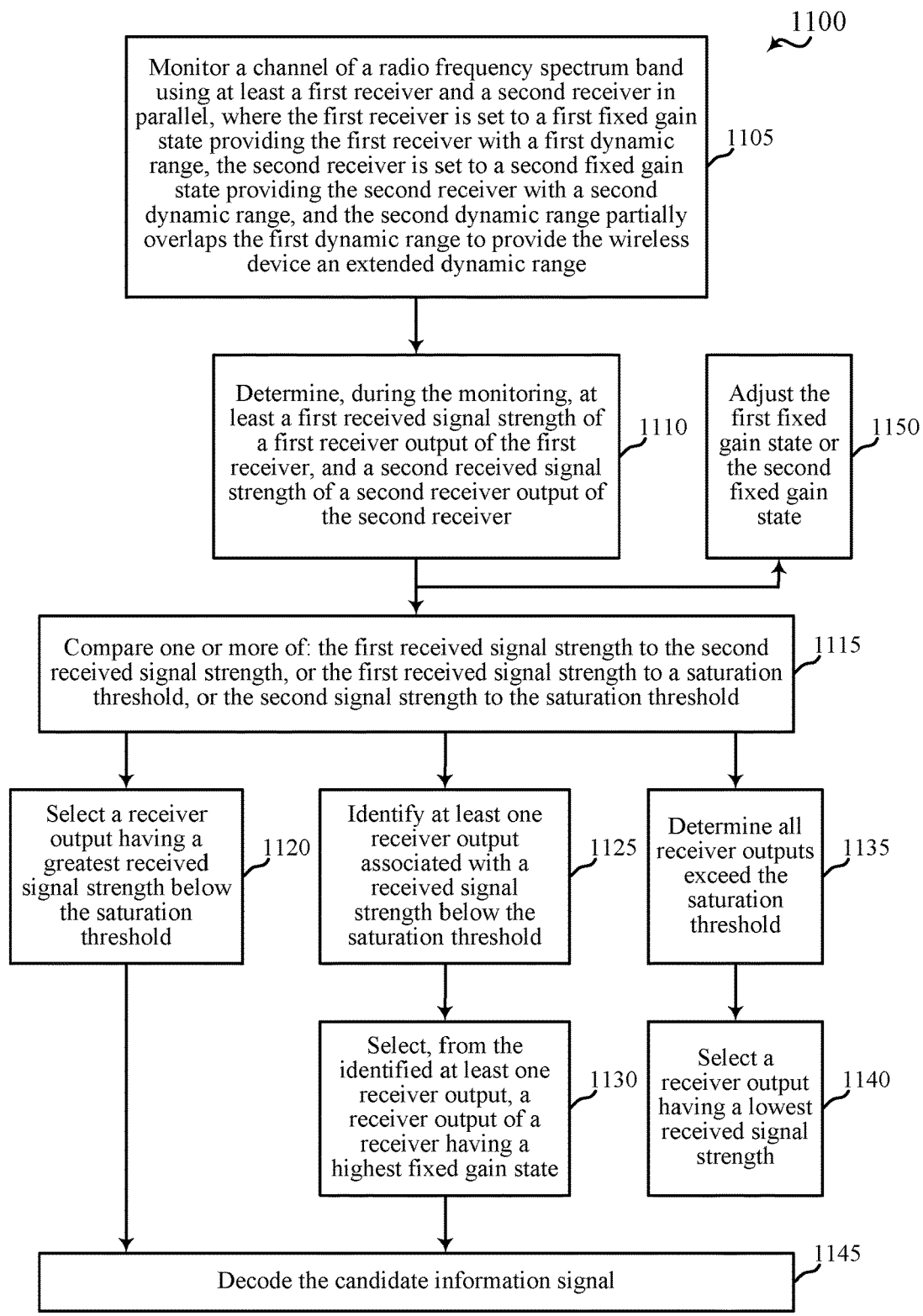
FIG. 11 is a flow chart illustrating an example of a method for wireless communication at a wireless device, in accordance with various aspects of the present disclosure.

FIG. 11 is a flow chart illustrating an example of a method 1100 for wireless communication at a wireless device, in accordance with various aspects of the present disclosure. For clarity, the method 1100 is described below with reference to aspects of one or more of the base stations 105 described with reference to FIGS. 1, 2, and 8, aspects of one or more of the UEs 115 described with reference to FIGS. 1, 2, and 9, aspects of the wireless device 305 described with reference to FIG. 3, or aspects of the apparatus 505 described with reference to FIG. 5. In some examples, a wireless device (which may be, or be a part of, a base station 105 or UE 115) may perform one or more of the functions described below using special-purpose hardware.

At block 1105, the method 1100 may include monitoring a channel of a radio frequency spectrum band using at least a first receiver and a second receiver in parallel. The first receiver may be set to a first fixed gain state and the second receiver may be set to a second fixed gain state. The first fixed gain state may provide the first receiver with a first dynamic range, and the second fixed gain state may provide the second receiver with a second dynamic range. The second dynamic range may partially overlap the first dynamic range to provide the wireless device an extended dynamic range. In some examples, the channel of the radio frequency spectrum band may be shared by cellular radio devices and Wi-Fi devices. The operation(s) at block 1105 may be performed using the wireless communication manager 520 described with reference to FIGS. 5-9, or the channel monitor 535 described with reference to FIGS. 5-7.

At block 1110, the method 1100 may include determining, during the monitoring, at least a first received signal strength of a first receiver output of the first receiver, and a second received signal strength of a second receiver output of the second receiver. In some examples, the first received signal strength may include a first RSSI, and the second received signal strength may include a second RSSI. In some examples, the candidate information signal may include a candidate Wi-Fi preamble. The operation(s) at block 1110 may be performed using the wireless communication manager 520 described with reference to FIGS. 5-9, or the signal strength determiner 540 described with reference to FIGS. 5-7.

At block 1115, the method 1100 may include comparing one or more of: the first received signal strength to the second received signal strength, or the first received signal strength to a saturation threshold, or the second signal strength to the saturation threshold. The operation(s) at block 1115 may be performed using the wireless communication manager 520 described with reference to FIGS. 5-9, or the signal strength comparator 605 described with reference to FIG. 6.

At one or more of blocks 1120, 1125, 1130, 1135, or 1140, the method 1100 may include selecting, based at least in part on the first received signal strength and the second received signal strength, one or both of the first receiver output or the second receiver output for use in decoding a candidate information signal.

At block 1120, the method 1100 may optionally include selecting a receiver output having a greatest received signal strength below the saturation threshold. The operation(s) at block 1120 may be performed using the wireless communication manager 520 described with reference to FIGS. 5-9, or the receiver output selector 545 described with reference to FIGS. 5-7.

At block 1125, the method 1100 may optionally include identifying at least one receiver output associated with a received signal strength below the saturation threshold; and at block 1130, the method 1100 may optionally include selecting, from the identified at least one receiver output, a receiver output of a receiver having a highest fixed gain state. The operation(s) at block 1125 or 1130 may be performed using the wireless communication manager 520 described with reference to FIGS. 5-9, or the receiver output selector 545 described with reference to FIGS. 5-7.

At block 1135, the method 1100 may optionally include determining all receiver outputs exceed the saturation threshold; and at block 1140, the method 1100 may optionally include selecting a receiver output having a lowest received signal strength. The operation(s) at block 1135 or 1140 may be performed using the wireless communication manager 520 described with reference to FIGS. 5-9, or the receiver output selector 545 described with reference to FIGS. 5-7.

At block 1145, the method 1100 may include decoding the candidate information signal. The operation(s) at block 1145 may be performed using the wireless communication manager 520 described with reference to FIGS. 5-9, or the decoding manager 610 described with reference to FIG. 6.

At block 1150, and in some examples in parallel with the operations at block 1115, 1120, 1125, 1130, 1135, or 1140, the method 1100 may include adjusting, based at least in part on the first received signal strength or the second received signal strength, one or both of: the first fixed gain state, or the second fixed gain state. In some examples, the adjusting may include setting the first fixed gain state and the second fixed gain state to a same fixed gain state. The operation(s) at block 1150 may be performed using the wireless communication manager 520 described with reference to FIGS. 5-9, or the gain adjuster 615 described with reference to FIG. 6.

Thus, the method 1100 may provide for wireless communication. It should be noted that the method 1100 is just one implementation and that the operations of the method 1100 may be rearranged or otherwise modified such that other implementations are possible.

Figure 12:
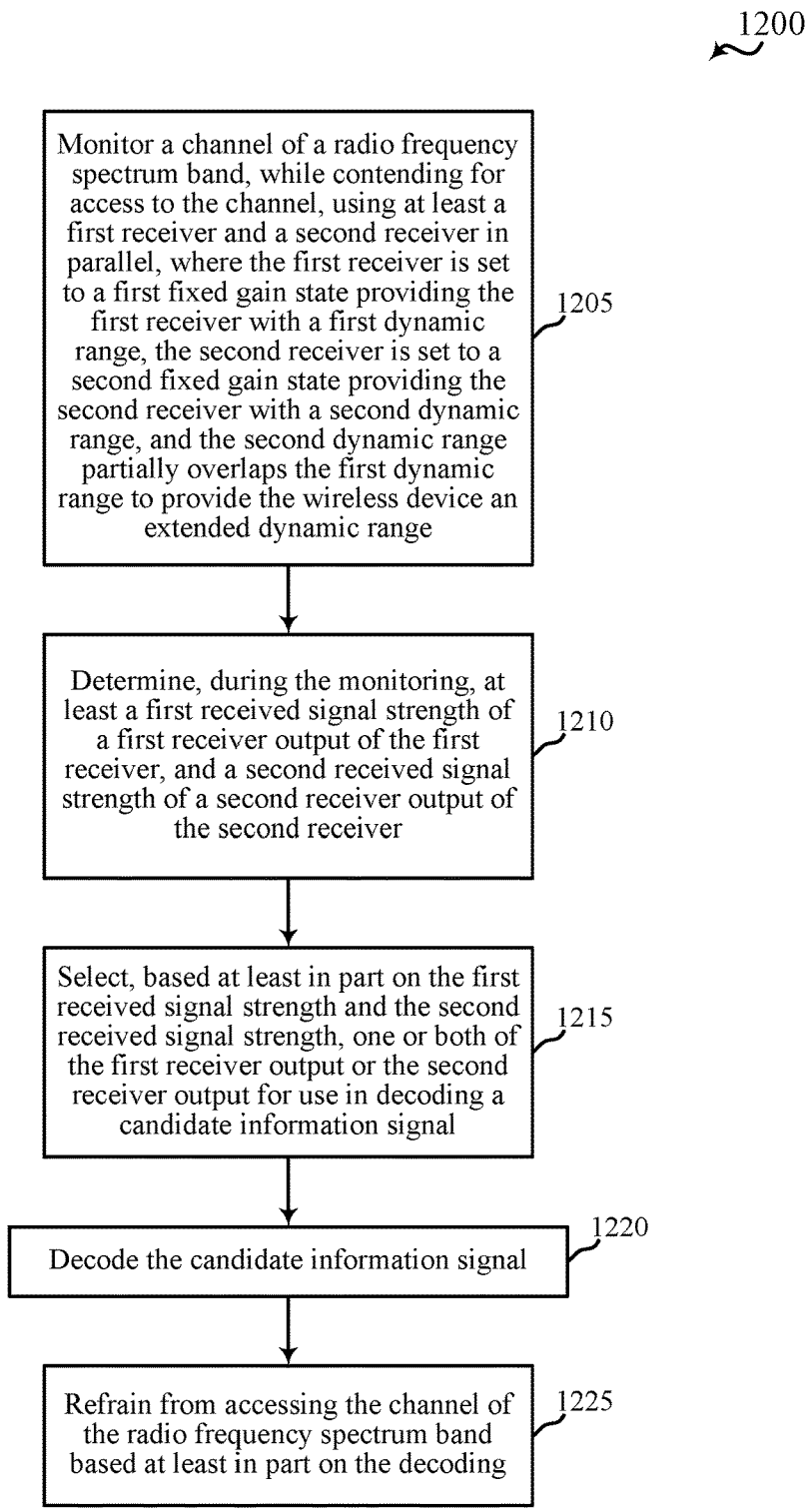
FIG. 12 is a flow chart illustrating an example of a method for wireless communication at a wireless device, in accordance with various aspects of the present disclosure.

FIG. 12 is a flow chart illustrating an example of a method 1200 for wireless communication at a wireless device, in accordance with various aspects of the present disclosure. For clarity, the method 1200 is described below with reference to aspects of one or more of the base stations 105 described with reference to FIGS. 1, 2, and 8, aspects of one or more of the UEs 115 described with reference to FIGS. 1, 2, and 9, aspects of the wireless device 305 described with reference to FIG. 3, or aspects of the apparatus 505 described with reference to FIG. 5. In some examples, a wireless device (which may be, or be a part of, a base station 105 or UE 115) may perform one or more of the functions described below using special-purpose hardware.

At block 1205, the method 1200 may include monitoring a channel of a radio frequency spectrum band using at least a first receiver and a second receiver in parallel, while contending for access to the channel of the radio frequency spectrum band. The first receiver may be set to a first fixed gain state and the second receiver may be set to a second fixed gain state. The first fixed gain state may provide the first receiver with a first dynamic range, and the second fixed gain state may provide the second receiver with a second dynamic range. The second dynamic range may partially overlap the first dynamic range to provide the wireless device an extended dynamic range. In some examples, the channel of the radio frequency spectrum band may be shared by cellular radio devices and Wi-Fi devices. The operation(s) at block 1205 may be performed using the wireless communication manager 520 described with reference to FIGS. 5-9, or the channel monitor 535 described with reference to FIGS. 5-7.

At block 1210, the method 1200 may include determining, during the monitoring, at least a first received signal strength of a first receiver output of the first receiver, and a second received signal strength of a second receiver output of the second receiver. In some examples, the first received signal strength may include a first RSSI, and the second received signal strength may include a second RSSI. In some examples, the candidate information signal may include a candidate Wi-Fi preamble. The operation(s) at block 1210 may be performed using the wireless communication manager 520 described with reference to FIGS. 5-9, or the signal strength determiner 540 described with reference to FIGS. 5-7.

At block 1215, the method 1200 may include selecting, based at least in part on the first received signal strength and the second received signal strength, one or both of the first receiver output or the second receiver output for use in decoding a candidate information signal. The operation(s) at block 1015 may be performed using the wireless communication manager 520 described with reference to FIGS. 5-9, or the receiver output selector 545 described with reference to FIGS. 5-7.

At block 1220, the method 1200 may include decoding the candidate information signal. The operation(s) at block 1220 may be performed using the wireless communication manager 520 described with reference to FIGS. 5-9, or the decoding manager 715 described with reference to FIG. 7.

At block 1225, the method 1200 may include refraining from accessing the channel of the radio frequency spectrum band based at least in part on the decoding. Optionally, the method 1200 may include obtaining a NAV from the decoding, and refraining from accessing the channel of the radio frequency spectrum band for a period of time indicated by the NAV. The operation(s) at block 1225 may be performed using the wireless communication manager 520 described with reference to FIGS. 5-9, or the channel contention manager 705 described with reference to FIG. 7.

In some examples, the method 1200 may optionally include detecting, based at least in part on the first receiver output or the second receiver output, an energy signature representing the candidate information signal. In some examples, detecting the energy signature may include one or both of: detecting an energy satisfying an energy threshold for a predetermined period of time, or detecting an average energy satisfying an average energy threshold for the predetermined period of time, or detecting a Wi-Fi preamble. In some examples, the selection made at block 1215 may be further based at least in part on detecting the energy signature representing the candidate information signal.

Thus, the method 1200 may provide for wireless communication. It should be noted that the method 1200 is just one implementation and that the operations of the method 1200 may be rearranged or otherwise modified such that other implementations are possible.

In some examples, aspects from two or more of the methods 1000, 1100, or 1200 described with reference to FIG. 10, 11, or 12 may be combined. It should be noted that the methods 1000, 1100, and 1200 are just example implementations, and that the operations of the methods 1000, 1100, or 1200 may be rearranged or otherwise modified such that other implementations are possible.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication at a wireless device, comprising:
    monitoring a channel of a radio frequency spectrum band using at least a first receiver and a second receiver in parallel, wherein the first receiver is set to a first fixed gain state providing the first receiver with a first dynamic range, the second receiver is set to a second fixed gain state providing the second receiver with a second dynamic range, and the second dynamic range partially overlaps the first dynamic range to provide the wireless device an extended dynamic range;
    determining, during the monitoring, at least a first received signal strength of a first receiver output of the first receiver, and a second received signal strength of a second receiver output of the second receiver; and
    selecting, based at least in part on the first received signal strength and the second received signal strength, one or both of the first receiver output or the second receiver output for use in decoding a candidate information signal.

2. The method of claim 1, further comprising:
    comparing one or more of: the first received signal strength to the second received signal strength, or the first received signal strength to a saturation threshold, or the second received signal strength to the saturation threshold;
    wherein the selecting is further based at least in part on the comparing.

3. The method of claim 2, wherein the selecting comprises:
    selecting a receiver output having a greatest received signal strength below the saturation threshold.

4. The method of claim 2, wherein the selecting comprises:

identifying at least one receiver output associated with a received signal strength below the saturation threshold; and selecting, from the identified at least one receiver output, a receiver output of a receiver having a highest fixed gain state.

5. The method of claim 2, wherein the selecting comprises:

determining all receiver outputs exceed the saturation threshold; and selecting a receiver output having a lowest received signal strength.

6. The method of claim 1, further comprising:

adjusting, based at least in part on the first received signal strength or the second received signal strength, one or both of: the first fixed gain state, or the second fixed gain state.

7. The method of claim 6, wherein the adjusting comprises:

setting the first fixed gain state and the second fixed gain state equal to a same fixed gain state.

8. The method of claim 1, further comprising:

performing the monitoring while performing a contention-based protocol to contend for access to the channel of the radio frequency spectrum band;

decoding the candidate information signal; and refraining from accessing the channel of the radio frequency spectrum band based at least in part on the decoding.

9. The method of claim 8, further comprising:

obtaining a network allocation vector (NAV) from the decoding; and refraining from accessing the channel of the radio frequency spectrum band for a period of time indicated by the NAV.

10. The method of claim 1, further comprising:

detecting, based at least in part on the first receiver output or the second receiver output, an energy signature representing the candidate information signal;

wherein the selecting is further based at least in part on detecting the energy signature representing the candidate information signal.

11. The method of claim 10, wherein detecting the energy signature comprises one or more of:

detecting an energy satisfying an energy threshold for a predetermined period of time, or detecting an average energy satisfying an average energy threshold for the predetermined period of time, or detecting a Wi-Fi preamble.

12. The method of claim 1, wherein the first received signal strength comprises a first received signal strength indicator (RSSI) and the second received signal strength comprises a second RSSI.

13. An apparatus for wireless communication at a wireless device, comprising:

means for monitoring a channel of a radio frequency spectrum band using at least a first receiver and a second receiver in parallel, wherein the first receiver is set to a first fixed gain state providing the first receiver with a first dynamic range, the second receiver is set to a second fixed gain state providing the second receiver with a second dynamic range, and the second dynamic range partially overlaps the first dynamic range to provide the wireless device an extended dynamic range;

means for determining, during the monitoring, at least a first received signal strength of a first receiver output of the first receiver, and a second received signal strength of a second receiver output of the second receiver; and means for selecting, based at least in part on the first received signal strength and the second received signal strength, one or both of the first receiver output or the second receiver output for use in decoding a candidate information signal.

14. The apparatus of claim 13, further comprising:

means for comparing one or more of: the first received signal strength to the second received signal strength, or the first received signal strength to a saturation threshold, or the second received signal strength to the saturation threshold;

wherein the selecting is further based at least in part on the comparing.

15. The apparatus of claim 14, wherein the means for selecting comprises:

means for selecting a receiver output having a greatest received signal strength below the saturation threshold.

16. The apparatus of claim 14, wherein the means for selecting comprises:

means for identifying at least one receiver output associated with a received signal strength below the saturation threshold; and means for selecting, from the identified at least one receiver output, a receiver output of a receiver having a highest fixed gain state.

17. The apparatus of claim 14, wherein the means for selecting comprises:

means for determining all receiver outputs exceed the saturation threshold; and means for selecting a receiver output having a lowest received signal strength.

18. The apparatus of claim 13, further comprising:

means for adjusting, based at least in part on the first received signal strength or the second received signal strength, one or both of: the first fixed gain state, or the second fixed gain state.

19. The apparatus of claim 18, wherein the means for adjusting comprises:

means for setting the first fixed gain state and the second fixed gain state equal to a same fixed gain state.

20. The apparatus of claim 13, further comprising:

means for performing the monitoring while performing a contention-based protocol to contend for access to the channel of the radio frequency spectrum band;

means for decoding the candidate information signal; and means for refraining from accessing the channel of the radio frequency spectrum band based at least in part on the decoding.

21. The apparatus of claim 20, further comprising:

means for obtaining a network allocation vector (NAV) from the decoding; and means for refraining from accessing the channel of the radio frequency spectrum band for a period of time indicated by the NAV.

22. The apparatus of claim 13, further comprising:

means for detecting, based at least in part on the first receiver output or the second receiver output, an energy signature representing the candidate information signal;

wherein the selecting is further based at least in part on detecting the energy signature representing the candidate information signal.

23. The apparatus of claim 22, wherein the means for detecting the energy signature comprises one or more of:

means for detecting an energy satisfying an energy threshold for a predetermined period of time, or means for detecting an average energy satisfying an average energy threshold for the predetermined period of time, or means for detecting a Wi-Fi preamble.

24. An apparatus for wireless communication at a wireless device, comprising:
a channel monitor to monitor a channel of a radio frequency spectrum band using at least a first receiver and a second receiver in parallel, wherein the first receiver is set to a first fixed gain state providing the first receiver with a first dynamic range, the second receiver is set to a second fixed gain state providing the second receiver with a second dynamic range, and the second dynamic range partially overlaps the first dynamic range to provide the wireless device an extended dynamic range;
a signal strength determiner to determine, during the monitoring, at least a first received signal strength of a first receiver output of the first receiver, and a second received signal strength of a second receiver output of the second receiver; and
a receiver output selector to select, based at least in part on the first received signal strength and the second received signal strength, one or more of the first receiver output or the second receiver output for use in decoding a candidate information signal.

25. The apparatus of claim 24, further comprising:
a signal strength comparator to compare one or more of: the first received signal strength to the second received signal strength, or the first received signal strength to a saturation threshold, or the second received signal strength to the saturation threshold;
wherein the receiver output selector further selects a receiver based at least in part on the comparing.

26. The apparatus of claim 24, further comprising:
a gain adjuster to adjust, based at least in part on the first received signal strength or the second received signal strength, one or both of: the first fixed gain state, or the second fixed gain state.

27. The apparatus of claim 26, wherein the gain adjuster sets the first fixed gain state and the second fixed gain state equal to a same fixed gain state.

28. The apparatus of claim 24, wherein the channel monitor performs the monitoring while performing a contention-based protocol to contend for access to the channel of the radio frequency spectrum band, the apparatus further comprising:
a channel decoder to decode the candidate information signal and refrain from accessing the channel of the radio frequency spectrum band based at least in part on the decoding.

29. The apparatus of claim 24, further comprising:
an energy signature detector to detect, based at least in part on the first receiver output or the second receiver output, an energy signature representing the candidate information signal;
wherein the receiver output selector further selects a receiver based at least in part on detecting the energy signature representing the candidate information signal.

30. A non-transitory computer-readable medium storing computer-readable code for wireless communications, the code comprising instructions executable to:
monitor a channel of a radio frequency spectrum band using at least a first receiver and a second receiver in parallel, wherein the first receiver is set to a first fixed gain state providing the first receiver with a first dynamic range, the second receiver is set to a second fixed gain state providing the second receiver with a second dynamic range, and the second dynamic range partially overlaps the first dynamic range to provide a wireless device an extended dynamic range;
determine, during the monitoring, at least a first received signal strength of a first receiver output of the first receiver, and a second received signal strength of a second receiver output of the second receiver; and
select, based at least in part on the first received signal strength and the second received signal strength, one or both of the first receiver output or the second receiver output for use in decoding a candidate information signal.

* * * * *